United States Patent [19]

Iwasaki

[11] Patent Number: 5,414,487
[45] Date of Patent: May 9, 1995

[54] LIGHT METERING CALCULATION APPARATUS

[75] Inventor: Hiroyuki Iwasaki, Tokyo, Japan

[73] Assignee: Nikon Corporation, Tokyo, Japan

[21] Appl. No.: 309,469

[22] Filed: Sep. 22, 1994

Related U.S. Application Data

[63] Continuation of Ser. No. 831,201, Jan. 31, 1992, abandoned.

[30] Foreign Application Priority Data

Feb. 13, 1991 [JP] Japan ................................ 3-040474
Apr. 9, 1991 [JP] Japan ................................ 3-103833

[51] Int. Cl.$^6$ ............................................. G03B 7/08
[52] U.S. Cl. ........................................................ 354/432
[58] Field of Search ................ 354/429, 430, 431, 432

[56] References Cited

U.S. PATENT DOCUMENTS

| | | | |
|---|---|---|---|
| 4,364,650 | 12/1982 | Terashita et al. | 354/432 |
| 4,443,080 | 4/1984 | Saegusa | 354/432 |
| 4,445,778 | 5/1984 | Nakauchi | 354/432 |
| 4,527,881 | 7/1985 | Sugawara | 354/432 |
| 4,929,824 | 5/1990 | Miyazaki | 354/432 |
| 4,978,990 | 12/1990 | Yamasaki et al. | 354/432 |
| 5,031,049 | 7/1991 | Toyama et al. | 354/430 |
| 5,184,172 | 2/1993 | Miyazaki | 354/432 |
| 5,204,749 | 4/1993 | Toyama et al. | 354/430 |

FOREIGN PATENT DOCUMENTS 1-231034 9/1989 Japan .

*Primary Examiner*—Russell E. Adams
*Attorney, Agent, or Firm*—Shapiro and Shapiro

[57] ABSTRACT

A light metering calculating apparatus used in an AE camera is disclosed. The light metering calculating apparatus includes a light metering device for performing a light metering operation while dividing an objective field into a plurality of light metering regions, and outputting light metering signals corresponding to the respective light metering regions, and a grouping device for grouping the plurality of light metering regions based on the light metering signals from the light metering device, in such a manner that the adjacent light metering regions having similar light are grouped as one group.

52 Claims, 31 Drawing Sheets

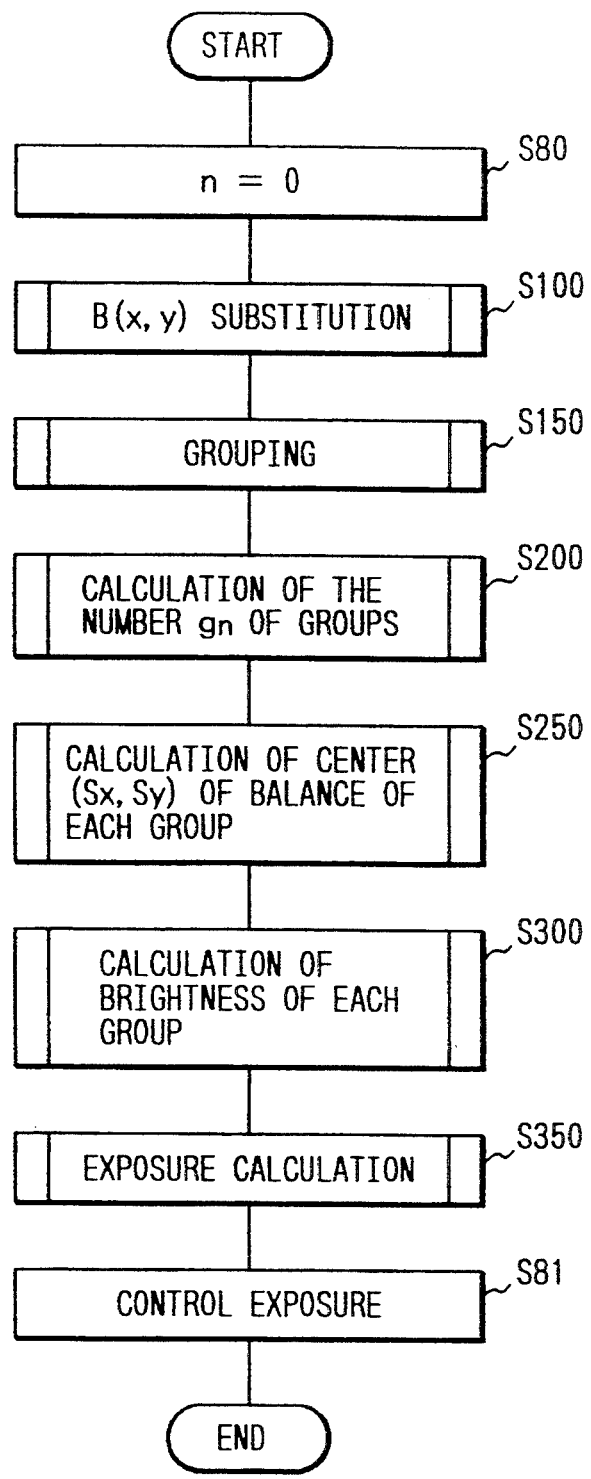

LIGHT METERING CALCULATION APPARATUS

This is a continuation of application Ser. No. 07/831,201 filed Jan. 31, 1992, now abandoned.

BACKGROUND OF THE INVENTION

2. Field of the Invention

The present invention relates to an exposure calculation apparatus used in an AE camera.

2. Related Background Art

As a conventional exposure calculation method, a method disclosed in, e.g., Japanese Laid-Open Patent Application No. 1-231034, is known. This method will be described below with reference to FIG. 1. An L-shaped region 2 including three corner portions of a photographing frame (objective field) 1 is cut (excluded) from the frame 1. Two L-shaped regions can be set for the photographing frame 1. Of these regions, a brighter one is cut. Similarly, a brighter L-shaped region 4 is cut from the remaining region 3, and thereafter, such processing is repeated. Thus, the remaining rectangular region becomes gradually small in size, and the darkest region 7 remains finally. An exposure value is calculated on the basis of the brightness of the darkest region 7.

In a general outdoor photographing scene, it is considered that the principal object is relatively dark, and the background (e.g., sky) is bright. Therefore, with the above-mentioned processing, a rough position of the principal object is assumed, a portion corresponding to the sky is excluded, and an exposure value is determined based only on the brightness of the principal object. In this manner, the possibility of obtaining a proper exposure value for the principal object can be increased.

In the conventional method, however, the finally remaining region 7 always becomes rectangular, while the principal object is not always rectangular. Therefore, an exposure value cannot always be accurately calculated based on the brightness of the principal object. As a result, an improper exposure value may often be obtained. When the principal object exists across sunny and shaded places, an exposure calculation is performed while cutting a portion corresponding to the sunny place, and an improper exposure value may be obtained in the same manner as described above.

SUMMARY OF THE INVENTION

It is an object of the present invention to provide an exposure calculation apparatus, which can reliably perform light metering operations of brightness values of objects even when a plurality of objects are present.

According to one aspect of the present invention, an apparatus comprises a light metering device for dividing an objective field into a plurality of regions, and outputting light metering outputs in units of divided regions, and a light metering region grouping device for comparing output values of the light metering device, and grouping the light metering regions which are adjacent to each other and have similar brightness values.

According to another aspect of the present invention, an apparatus comprises a light metering device for dividing an objective field into a plurality of regions, and outputting light metering outputs in units of divided regions, a light metering region grouping device for comparing output values of the light metering device, and grouping the light metering regions which are adjacent to each other and have similar brightness values, a number of groups calculating device for calculating the number of groups grouped by the grouping device, a group brightness calculating device for calculating an average brightness in each group, a device for calculating a position of a center of balance of the regions in each group, and an exposure calculating device for calculating an optimal exposure value on the basis of a light metering value at the obtained position of the center of balance.

According to the present invention, adjacent portions having similar brightness values of an objective field are grouped into a block, and light metering operations are performed in units of blocks. For this reason, light metering values can be obtained in units of blocks. If it is determined that a bright portion having the high position of the center of balance is sky, a light metering operation influenced by the bright portion can be prevented.

It is another object of the present invention to provide an exposure calculation apparatus for a camera, which can always obtain a proper exposure value.

According to still another aspect of the present invention, an apparatus comprises a light metering device for performing a light metering operation while dividing an objective field into a plurality of regions, and outputting light metering signals each including information associated with a color of an object present in a corresponding region, a grouping device for grouping the plurality of regions on the basis of the light metering signals from the light metering device under a condition that the regions to be grouped are present adjacent to each other and include objects having similar colors, a device for calculating a position of a center of balance in each group in the objective field, a brightness calculating device for calculating a brightness value of each group on the basis of the corresponding light metering signal from the light metering device, and an exposure calculating device for calculating an exposure value on the basis of the brightness value of the groups excluding the groups having a relatively high position of the center of balance and a high brightness value.

The light metering device performs a light metering operation while dividing the objective field into a plurality of regions, and outputs light metering signals each including information associated with the color of an object present in the corresponding region. The grouping device groups the plurality of regions on the basis of the light metering signals from the light metering device under a condition that the regions to be grouped are present adjacent to each other and include objects having similar colors. The device for calculating the position of the center of balance calculates the position of the center of balance in each group in the objective field. The brightness calculating device calculates a brightness value of each group on the basis of the corresponding light metering signal from the light metering device. The exposure calculating device calculates an exposure value on the basis of the brightness value of the groups excluding the groups having a relatively high position of the center of balance and a high brightness value. With this arrangement, the objective field is divided into the plurality of regions, and the regions are grouped depending on whether or not they have similar colors. For this reason, even when a principal object exists across sunny and shaded places, the principal object can be reliably recognized, and its shape can be accurately determined. Therefore, since an exposure calculation is performed while cutting regions other than the principal object, a photographing operation can always be performed with a proper exposure value.

BRIEF DESCRIPTION OF THE DRAWINGS

FIG. 4 is a general flow chart showing the operation of the apparatus shown in FIG. 1;

DESCRIPTION OF THE PREFERRED EMBODIMENTS

Figure 2:
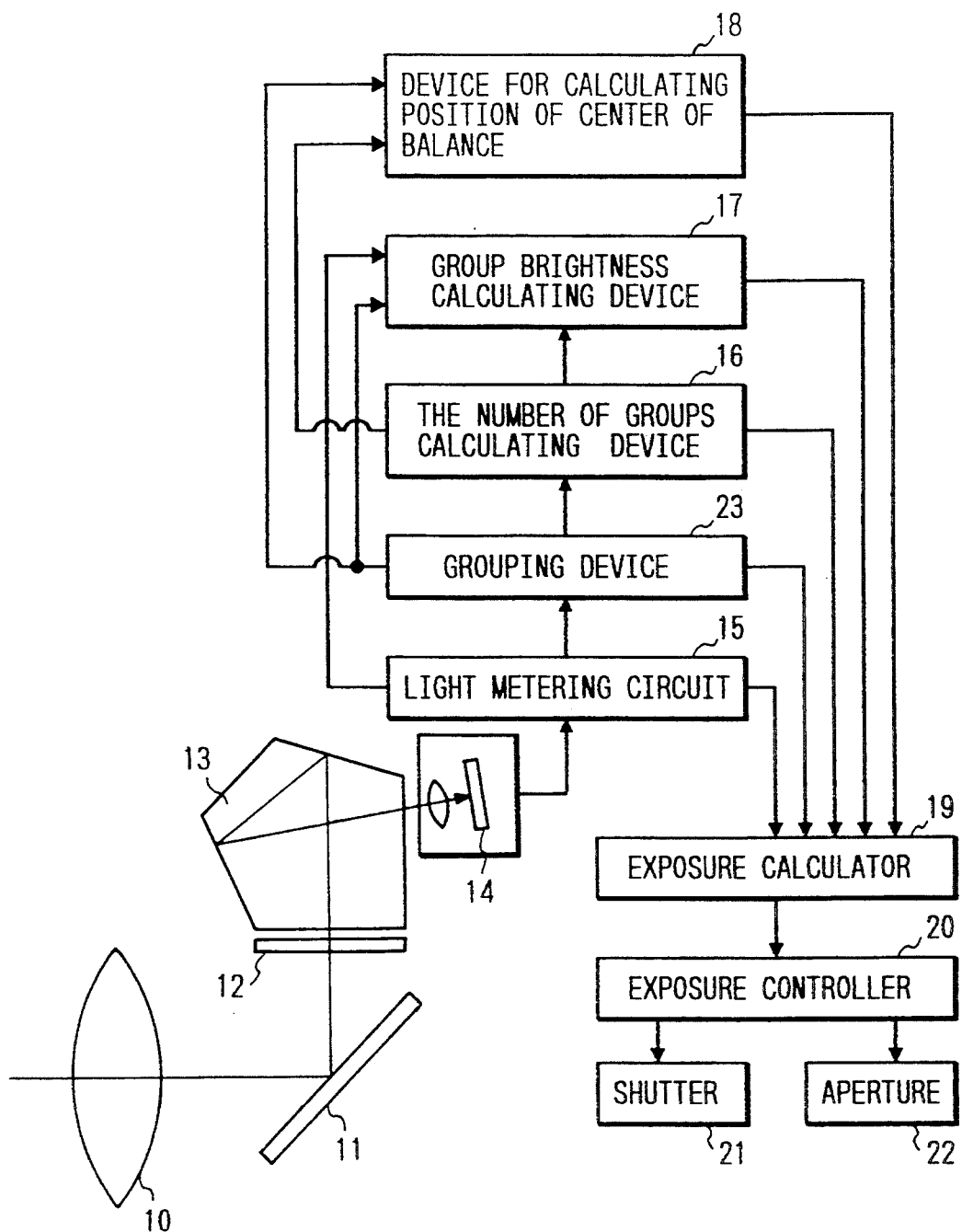
FIG. 2 is a block diagram showing an apparatus according to an embodiment of the present invention.

FIG. 2 is a block diagram showing an embodiment of the present invention. Light received through an objective lens 10 is detected by a light-receiving element 14 through a main mirror 11, a screen 12, and a pentagonal prism 13. Information detected by the light-receiving element 14 is supplied to a light metering circuit 15, a number of groups calculating device 16, a group brightness calculating device 17, and a device 18 for calculating the position of the center of balance, and is subjected to predetermined processing operations. Pieces of processed information are supplied to an exposure calculator 19, and an optimal exposure value is calculated. Thus, a shutter 21 and an aperture 22 are controlled based on the calculated exposure value through an exposure controller 20.

Figure 1:
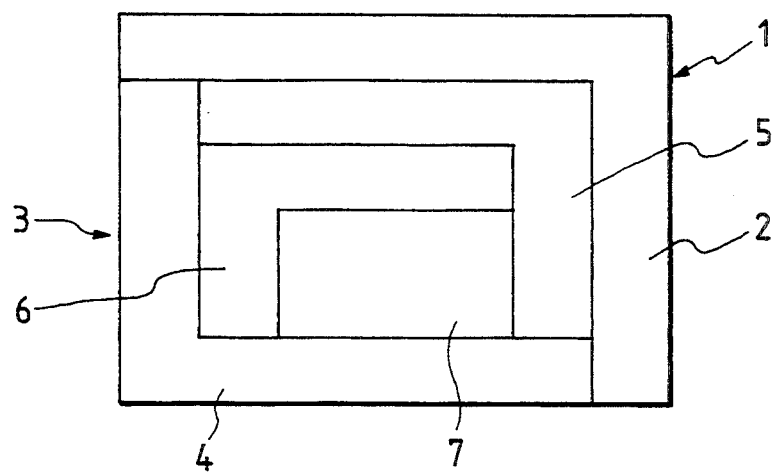
FIG. 1 is a view for explaining a conventional exposure calculation method.
Figure 3A:
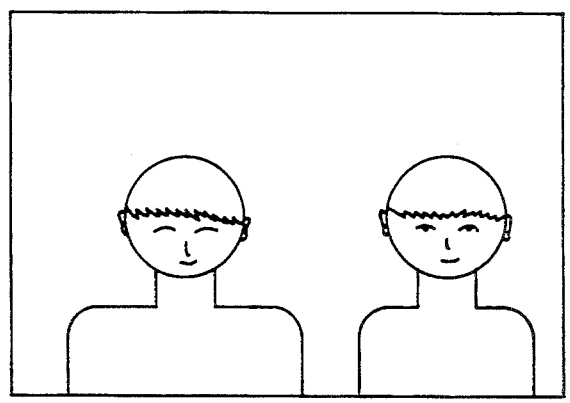
FIGS. 3A and 3B are views respectively showing an example of objects, and a brightness distribution on a frame.

In the apparatus of this embodiment, when objects shown in FIG. 3A are to be photographed, object images are formed on the surface of the light-receiving element 14 constituted by a plurality of light-receiving cells arranged as a matrix. Adjacent cells with similar outputs are processed as one group, and the brightness is measured in units of groups, thereby determining an exposure amount. In this case, the cells of a portion indicated by numeral 30 are processed as a group 1, those of a portion indicated by numeral 31 are processed as a group 2, and a portion indicated by numeral 32 is processed as a group 3. Since the group 1 is bright, and is present at a high position, it is determined as the sky, and is normally excluded from an exposure object. The groups, which are present at lower positions and are dark, correspond to persons. Normally, since objects located at lower positions of a frame are often photographed, an exposure amount can be determined in correspondence with lower objects.

The circuits shown in FIG. 2 are used for performing the above-mentioned processing. The light metering circuit 15 measures an absolute brightness value (BV value) of received light. A grouping device groups adjacent cells having similar brightness values of a plurality of light-receiving cells shown in FIG. 3B. The number of groups calculating device 16 calculates the number of groups. The group brightness calculating device 17 measures the brightness of each group. The device 18 calculates the center of balance of each group.

Figure 3B:
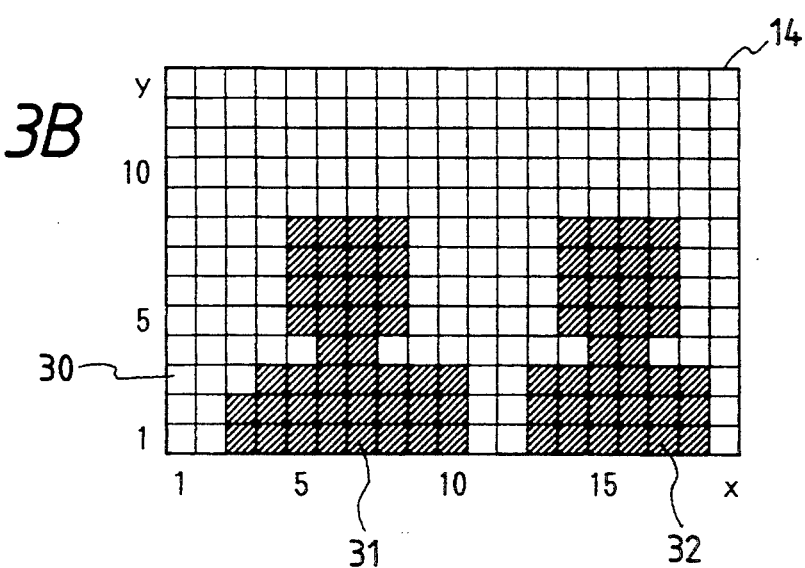

The operation of this apparatus will be described below with reference to the flow charts. Since a large number of variables appear in these flow charts, the variables are defined as follows:

| | | |
|---|---|---|
| (a) x, y | a variable indicating an address of the light-receiving element; in FIG. 3B, x assumes a value ranging between 0 and 19, and y assumes a value ranging between 0 and 13 | |
| (b) BV(x,y) | a brightness value output from the light-receiving element | |
| (c) B(x,y) | a value obtained by rounding BV into an integer | |
| (d) N(x,y) | a group number to which the light-receiving element belongs | |
| (e) n | a value representing the number of groups incremented in a group renewal subroutine | |
| (f) gn | a value obtained by subtracting the number of invalid groups from n (total number of valid groups) | |
| (g) $B_{min}$ | a minimum value of B(x,y) | |
| (h) $B_{max}$ | a maximum value of B(x,y) | |
| (i) FLG(n) | a flag, set to be "1" if an nth group is valid; "0" if it is invalid | |
| (j) K(n) | the number of elements belonging to a group of a group number n | |
| (k) KN | an invalid group number as a variable input to a group number correction subroutine | |
| (l) RN | a valid group number as a variable input to the group number correction subroutine | |
| (m) Sx(i) | a barycentric coordinate (x) of a group of a group number i | |
| (n) Sy(i) | a barycentric coordinate (y) of a group of the group number i | |
| (o) BVG(i) | an average brightness value of a group of the group number i (an average value of values BV(x,y) belonging to the group i) | |

FIG. 4 is a flow chart showing an operation of the main routine of this apparatus. In step S80, processing for setting n=0 is executed. Then, a B(x,y) substitution subroutine in step S100, a grouping subroutine in step S150, a subroutine for calculating the number gn of groups in step S200, a subroutine for calculating the position (Sx, Sy) of the center of balance of each group in step S250, a subroutine for calculating the brightness of each group in step S300, and an exposure calculation subroutine in step S350 are sequentially executed. Thereafter, exposure control in step S81 is executed. These subroutines will be described in detail later.

Figure 5:
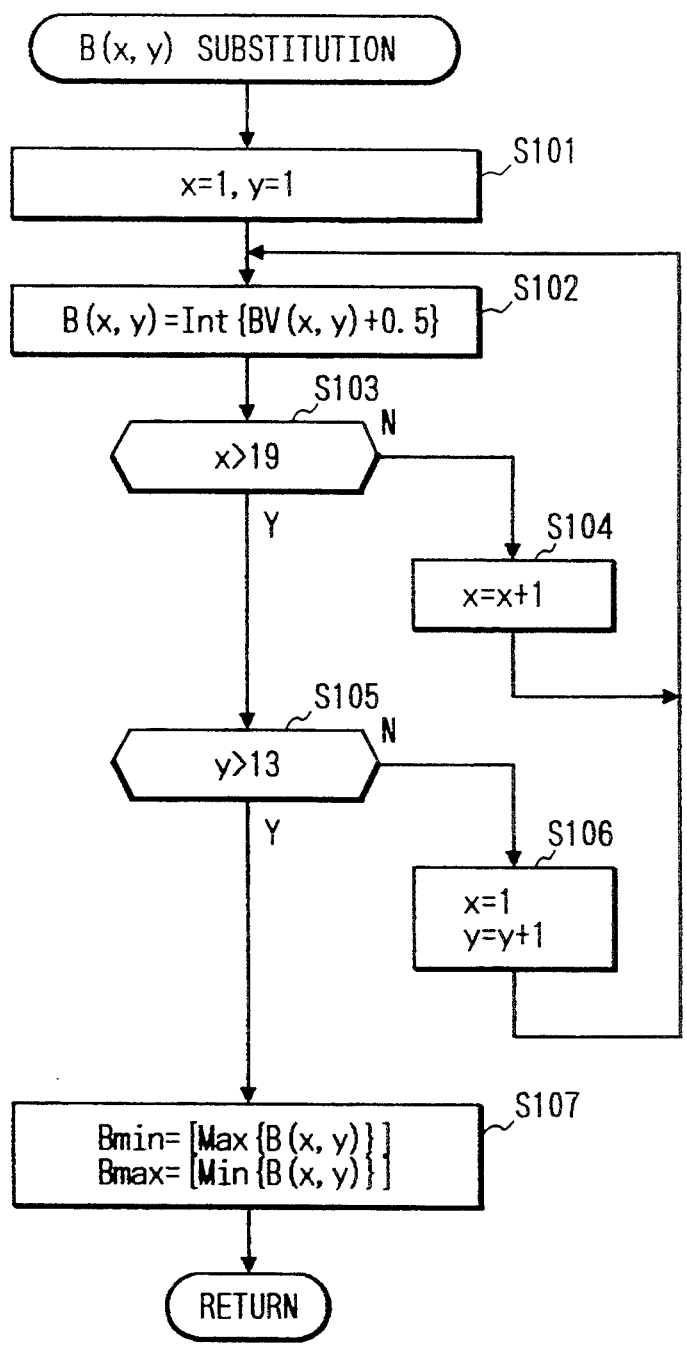
FIG. 5 is a flow chart showing in detail a B(x,y) (obtained by rounding a brightness value BV into an integer) substitution subroutine in step S100 shown in FIG. 4.

FIG. 5 is a flow chart for explaining the B(x,y) substitution subroutine in step S100 shown in FIG. 4. In this processing, integral brightness values B(x,y) obtained by rounding brightness values BV(x,y) output from the light-receiving element into integers are obtained, and their maximum and minimum values are obtained.

In this processing, x=1, and y=1 are set in step S101. In step S102, an integral brightness value is obtained by calculating B(x,y)=Int{BV(x,y)+0.5}. In the processing in step S102, a brightness output value BV(x,y) of the light-receiving value on the x-y coordinate system is rounded into an integer. Then, the integral brightness value B(x,y) is repetitively obtained in step S102 while incrementing the value x in step S104 until it is determined in step S103 that x has reached 19 as the maximum value of the x-coordinate.

After all the integral brightness values in the x-direction are obtained, a decision in step S105 is made. However, since y=1 at this time, the y-coordinate is incremented by one in step S106, and processing operations in steps S102 to S104 are repeated again to obtain the integral brightness value of the x-coordinate at the incremented y-coordinate. Upon repetition of this processing, since it is determined in step S105 that y>13, the maximum and minimum values $B_{max}$ and $B_{min}$ of the integral brightness values B(x,y) calculated so far are obtained in step S107. Thus, the B(x,y) substitution subroutine in step S100 in FIG. 4 is ended.

Figure 6:
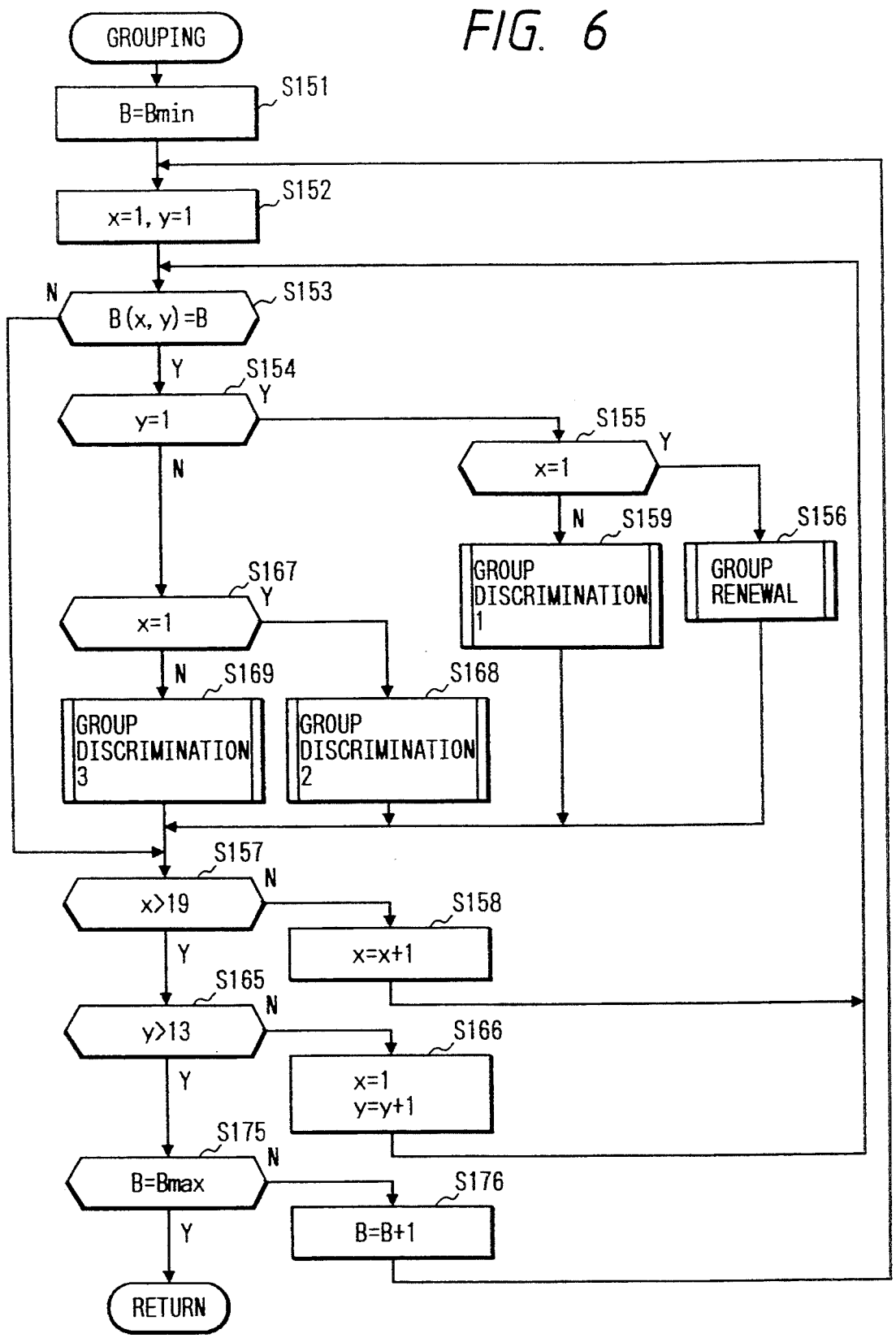
FIG. 6 is a flow chart showing in detail a grouping subroutine in step S150 shown in FIG. 4.

FIG. 6 shows a subroutine for realizing grouping in step S150 shown in FIG. 4. In step S151, a decision brightness value B as a decision reference is set to be $B_{min}$ obtained in step S107 shown in FIG. 5, and x=1 and y=1 are set in step S152. In step S153, it is checked if a brightness value B(x,y) output from the light-receiving element at this coordinate position is equal to the decision reference value B set in step S151.

At this time, since the decision reference value is set to be a minimum brightness value previously measured and output from the light-receiving element, the probability of coincidence between the two values is low. However, for the sake of easy understanding, the following description will be made under an assumption that a coincidence is detected.

If it is determined in step S153 that B(x,y) is equal to B, in this case, $B_{min}$ set in step S151, it is checked in step S154 if y=1. Since y=1 at this time, it is checked in step S155 if x=1. Since x=1, group renewal subroutine processing in step S156 is executed in this case (as will be described in detail later, this processing is performed only for the lower left edge of the frame when x=1). Since it is determined in step S157 that x>19 is not satisfied, the x-coordinate is incremented in step S158, and the flow then returns to step S153.

In the following description, assume that it is determined in step S153 that B(x,y)=B, i.e., $B_{min}$. In this case, since it is determined in step S154 that y=1, since the x-coordinate was incremented in step S158, it is determined in step S155 that x=1 is not satisfied, and group discrimination 1 processing in step S159 is executed (as will be described in detail later, in this case, this processing is performed only for the lower edge of the frame).

Thereafter, the x-coordinate is incremented in steps S157 and S158 in the same manner as described above, and the flow then returns to step S153. Since the same processing as described above is repeated, it is then determined in step S157 that x>19. However, since it is determined in step S165 that y>13 is not satisfied, processing of x=1, and y=y+1 is performed in step S166, and the flow returns to step S153.

At this time, since it is determined in step S154 that y=1, and it is determined in step S167 that x=1, group discrimination 2 processing in step S168 is executed (as will be described in detail later, this processing is performed for the left edge of the frame excluding the lower left edge). Thereafter, since the x-coordinate is incremented in step S158 until it is determined in step S157 that x>19, it is determined in turn in step S167 that x=1 is not satisfied, and group discrimination 3 processing in step S169 is executed (this processing is one for a region excluding the left and lower edges of the frame, as will be described later).

Thereafter, the group discrimination 2 processing in step S168 and the group discrimination 3 processing in step S169 are executed while repeating the x-coordinate increment processing in step S158 and the y-coordinate increment processing in step S166. When y exceeds 13, it is checked in step S175 if $B=B_{max}$. Since the brightness value B is set to be B=$B_{min}$ in step S151, processing for incrementing the brightness value by one step is executed in step S176, and the flow returns to step S152. The same processing described above is similarly performed. When the above-mentioned processing is completed for all the brightness values, the grouping processing is ended.

Figure 7:
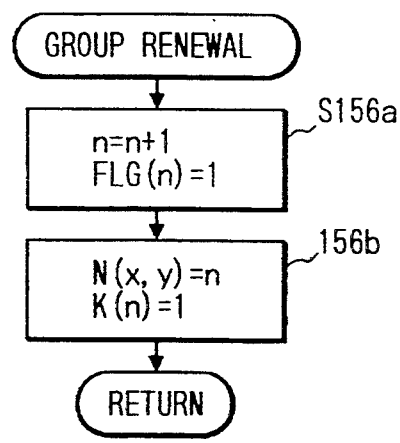
FIG. 7 is a flow chart showing in detail a group renewal subroutine in step S156 shown in FIG. 6.

FIG. 7 shows the detailed content of group renewal processing in step S156 shown in FIG. 6. In step S156a, the number n of groups is incremented, and the flag FLG(n)=1 is set to indicate that a group number n is valid. The flag FLG (n) is a variable indicating whether or not the group number n is valid. If FLG(n)=1, the group number n is valid; if FLG(n)=0, it is invalid. The reason why the variable FLG is necessary is to take a countermeasure against a case wherein two groups are combined while scanning x and y in the grouping subroutine shown in FIG. 6. This example will be described in a group discrimination 3 subroutine shown in FIG. 10, and in a group number correction subroutine shown in FIG. 12.

In step S156b, processing for substituting the group number n in a variable N(x,y) representing a group to which a pixel at an address (x,y) belongs, and processing K(n) for substituting the number of elements of a group n, i.e., the number of elements belonging to a group of the group number n, are performed. In this case, since a group is just formed, the number of elements is 1, and K(n)=1 is set. Thus, the group renewal processing is ended.

Figure 8:
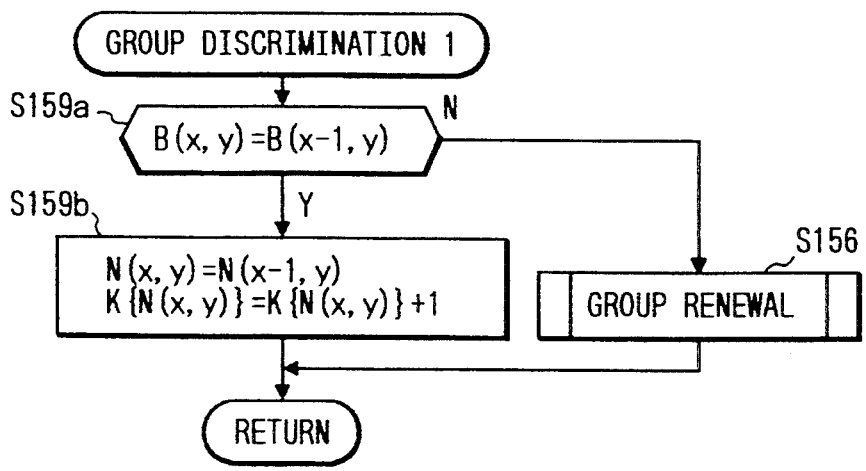
FIG. 8 is a flow chart showing in detail a group discrimination 1 subroutine in step S159 shown in FIG. 6.

FIG. 8 shows the detailed content of the group discrimination 1 processing in step S159 shown in FIG. 6. In step S159a, it is checked if a brightness value B(x,y) of a given pixel, which value is obtained by rounding a brightness value BV into an integer, is equal to a brightness value B{(x−1),y} of the left neighboring pixel of the given pixel. If Y (YES) in step S159a, a group number N{(x−1),y} of the left neighboring pixel is substituted in a group number N(x,y) to which the light-receiving element belongs in step S159b, thereby incrementing the number K{N(x,y)} of elements belonging to the group of the group number n. If N (NO) in step S159a, the group renewal processing in step S156 (processing shown in FIG. 7) is executed.

Figure 9:
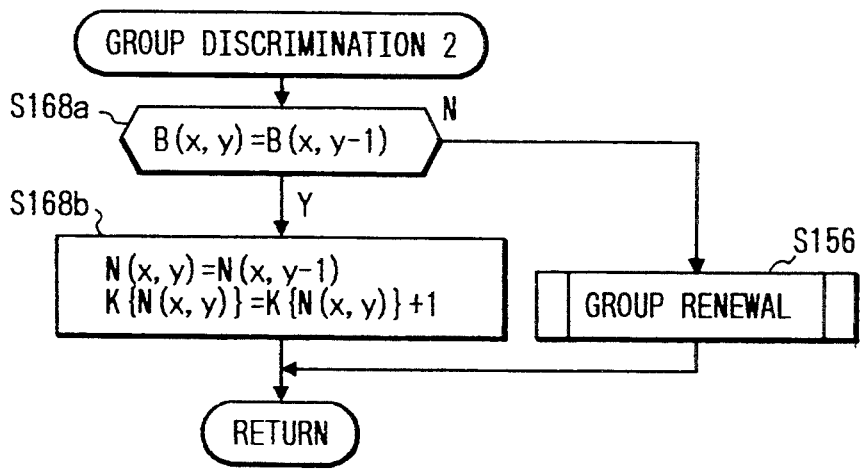
FIG. 9 is a flow chart showing in detail a group discrimination 2 subroutine in step S168 shown in FIG. 6.

FIG. 9 shows the detailed content of the group discrimination 2 processing in step S168 shown in FIG. 6. In step S168a, it is checked if a brightness value B(x,y) of a given pixel, which value is obtained by rounding a brightness value BV into an integer, is equal to a brightness value B{x,(y−1)} of a pixel immediately below the given pixel. If Y in step S168a, a group number N{x,(y−1)} of the pixel immediately below the given pixel is substituted in the group number N(x,y) to which the light-receiving element belongs in step S168b, thereby incrementing the number K{N(x,y)} of elements belonging to the group of the group number n. If N in step S168a, the group renewal processing in step S156 (processing shown in FIG. 7) is executed.

Figure 10:
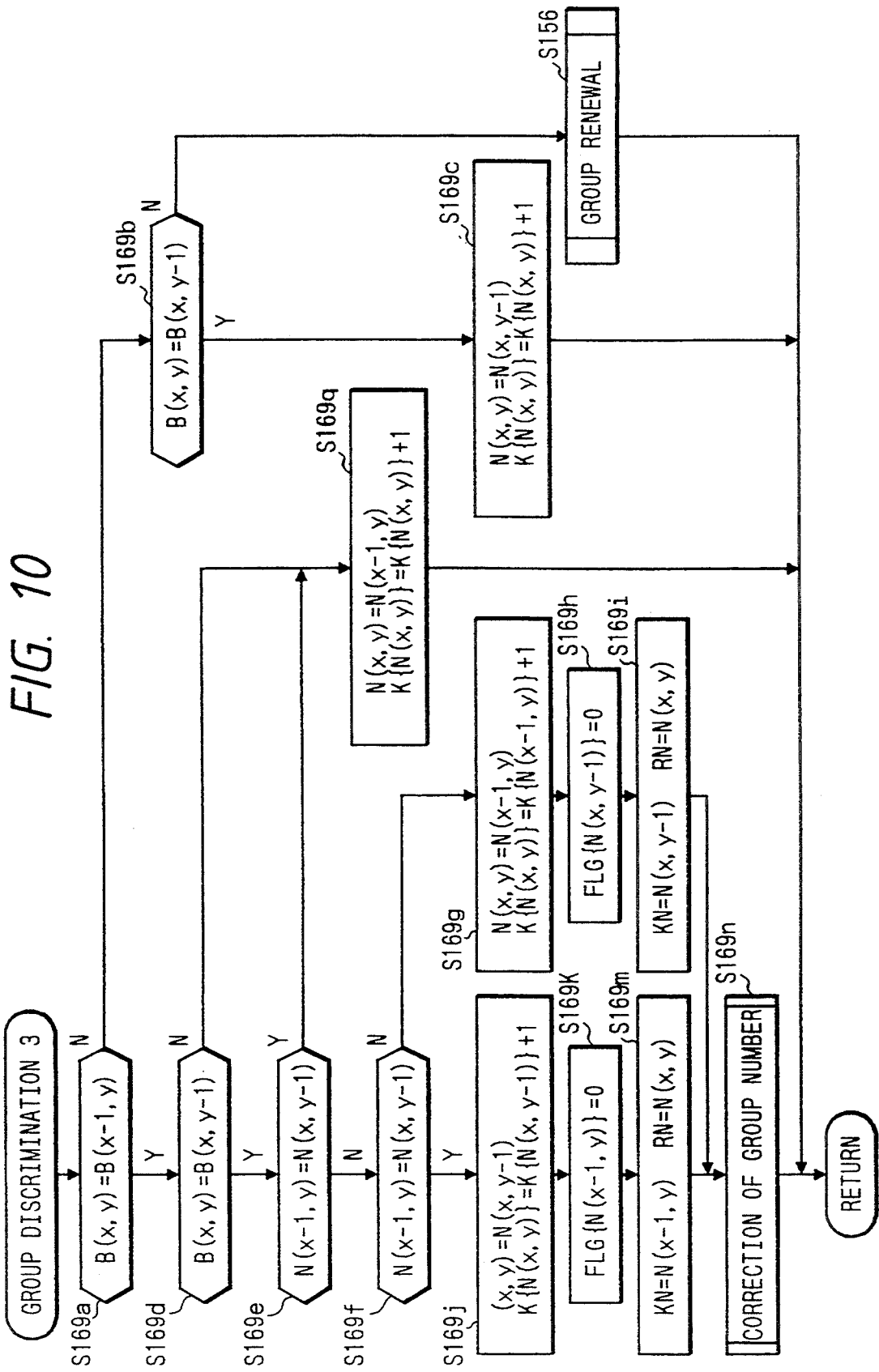
FIG. 10 is a flow chart showing in detail a group discrimination 3 subroutine in step S169 shown in FIG. 6.

FIG. 10 shows the detailed content of the group discrimination 3 processing in step S169 shown in FIG. 6. In step S169a, it is checked if a brightness value B(x,y) of a given pixel, which value is obtained by rounding a brightness value BV into an integer, is equal to a brightness value B{(x−1),y} of the left neighboring pixel of the given pixel. If N in step S169a, processing in step S169b is executed; otherwise, processing in step S169d is executed.

In step S169b, it is checked if the brightness value B(x,y) is equal to a brightness value B{x,(y−1)} of a pixel immediately below the given pixel. If N in step S169b, the group renewal processing in step S156 (processing shown in FIG. 7) is executed; otherwise, the group number N{x,(y−1)} of the pixel immediately below the given pixel is substituted in the group number N(x,y) to which the light-receiving element belongs in step S169c, thereby incrementing the number K{N(x,y)} of elements belonging to the group of the group number n.

In step S169d, it is checked if the brightness value B(x,y) is equal to a brightness value B{x,(y-1)} of a pixel immediately below the given pixel. If N in step S169d, the group number N{(x−1),y} of the left neighboring pixel of the given pixel is substituted in the group number N(x,y) to which the light-receiving element belongs in step S169q, thereby incrementing the number K{N(x,y)} of elements belonging to the group of the group number n. If Y in step S169d, processing in step S169e is executed.

In step S169e, it is checked if a group number at an address (x−1,y) is equal to a group number at an address (x,y−1). If Y in step S169e, the processing in step S169q is executed; otherwise, processing in step S169f is executed.

In step S169f, the group number at the address (x−1,y) is compared with the group number at the address (x,y−1). In this case, since the addresses (x−1,y) and (x,y−1) are combined into the same group, the group numbers are standardized to a smaller one.

Figure 11:
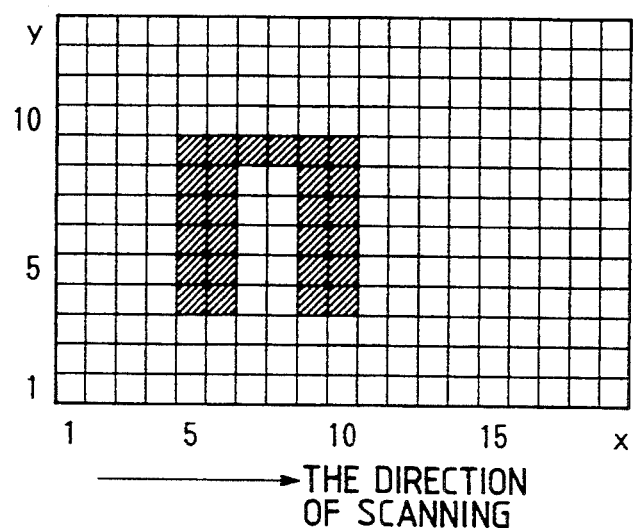
FIG. 11 is a view for explaining the reason why group number correction is performed.

This is for the following reason. For example, if an object shown in FIG. 11 is present, the grouping subroutine performs grouping while scanning from x=1 and y=1 in the x-direction. For this reason, when x=5 and y=5 are reached, the number of groups is incremented since an object having a different brightness value is detected. When y=5 and x=9 are reached, the control encounters an object having a different brightness value again, and increments the number of groups. However, the object detected when y=5 and x=5, and the object detected when y=5 and x=9 are portions of the same object (these objects are connected at the upper side). However, since this fact can be found only when y=9 and x=9 are reached, these objects are counted as different ones. For this reason, when y=9 and x=9 are reached, the groups are combined, and the group number, and the like are corrected.

If it is determined in step S169f that N{(x−1),y} is smaller than N{x,(y−1)}, N is substituted in step S169g to increment K. In step S169h, 0 is substituted in a group valid flag FLG(x,y−1) at the address (x,y−1). In step S169i, a group number which disappears after combination is substituted in an invalid group number KN as a variable to be input to a group number correction subroutine (to be described later), and a group number after combination is substituted in a valid group number RN as a variable to be input to the group number correction subroutine. The group number correction subroutine is then executed in step S169n.

If it is determined in step S169f that N{(x−1),y} is larger than N{x,(y−1)}, processing operations in steps S169j to S169m are executed, and thereafter, the group number correction subroutine in step S169n is executed. Since these processing operations have substantially the same processing content as those in steps S169g to S169i except that only variables x and y are different, a description thereof will be omitted.

Figure 12:
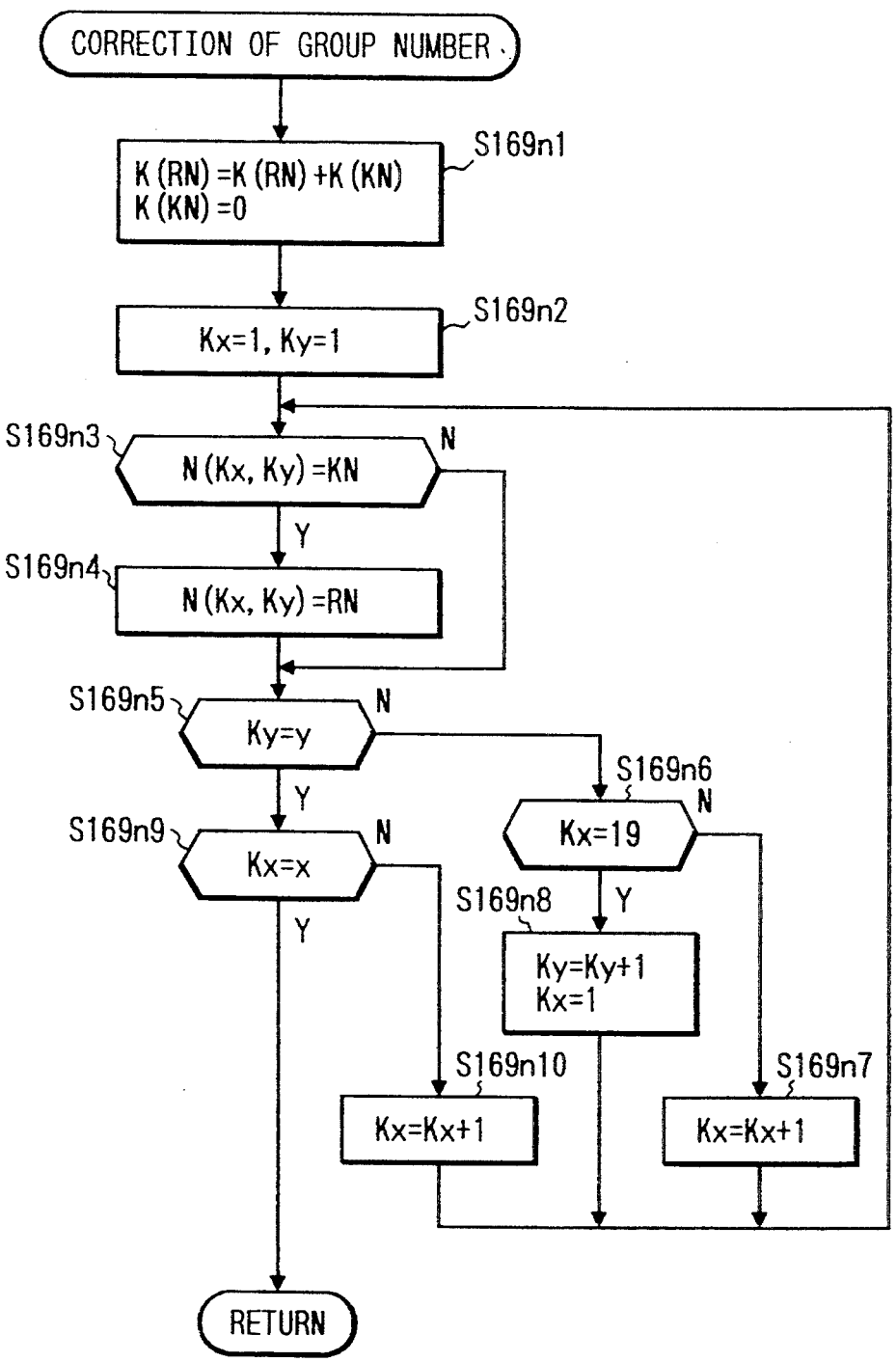
FIG. 12 is a flow chart showing in detail a group number correction subroutine in step S169n shown in FIG. 10.

FIG. 12 shows the detailed content of the group number correction subroutine in step S169n shown in FIG. 10. In step S169n1, the numbers K(n) of elements of groups to be combined are added to each other (in this case, we use expression K(RN) since a value RN that remains after addition is set to be a variable n). The number of elements of a group to disappear is cleared to zero by way of caution.

In step S169n2, processing for respectively setting coordinates Kx and Ky used in only this subroutine to be an initial value 1 is executed. Thereafter, in step S169n3, it is checked if a pixel at an address (Kx,Ky) is KN (the group number to disappear after combination). If Y in step S169n3, the group number is rewritten with RN (the group number to be left after combination) in step S169n4. If N in step S169n3, the flow skips the processing in step S169n4.

It is checked in step S169n5 if Ky=y. If N in step S169n5, processing in step S169n6 is executed; otherwise, processing in step S169n9 is executed.

In step S169n6, it is checked if kx has reached 19, i.e., the right end of the frame. If x=19, ky is incremented, and kx=1 is set in step S169n8; otherwise, kx is incremented in step S169n7.

It is checked in step S169n9 if Kx=x. If N in step S169n9, Kx is incremented in step S169n10, and the flow returns to step S169n3. If Y in step S169n9, this subroutine is ended.

Figure 13:
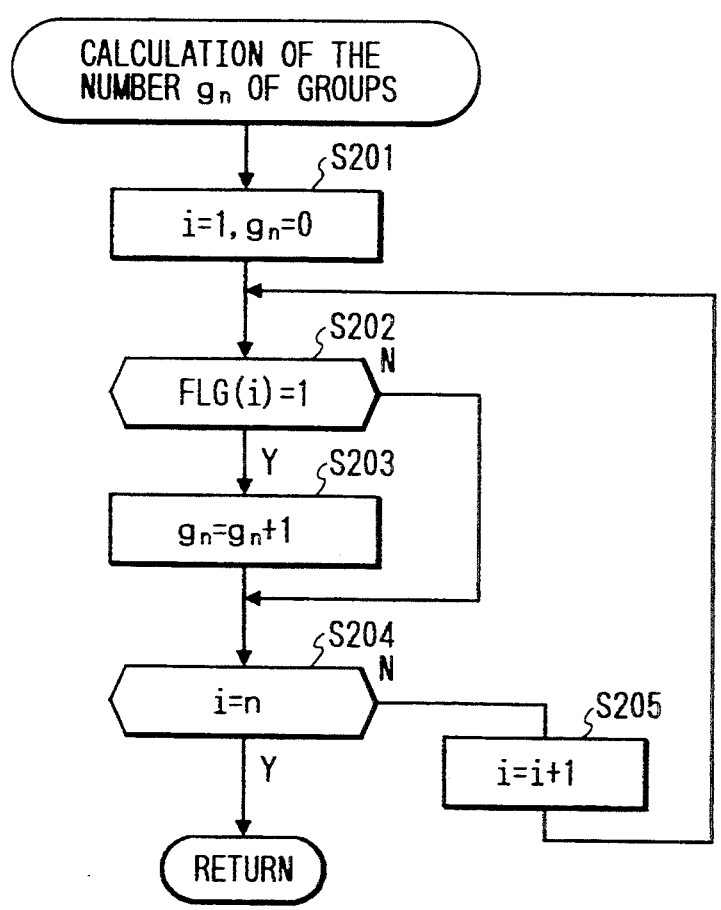
FIG. 13 is a flow chart showing in detail a subroutine for calculating the number gn of groups in step S200 shown in FIG. 4.

FIG. 13 shows in detail a subroutine for calculating the number gn of valid groups in step S200 shown in FIG. 4. Note that n is a variable representing the number of groups. However, when the groups are combined to one group during processing, since the accurate number of groups cannot be expressed by only the variable n, we use another variable gn. In FIG. 13, in step S201, processing for setting a group number i to be 1, and setting the number gn of valid groups to be 0 is executed.

In step S202, it is checked if FLG(i)=1, i.e., if the group number i is valid. If Y in step S202, gn is incremented in step S203; otherwise, the flow skips step S203. In step S204, it is checked if i=n, i.e., if the group number i has reached the last number. If N in step S204, i is incremented in step S205, and the flow returns to step S202. If Y in step S204, this subroutine is ended.

Figure 14:
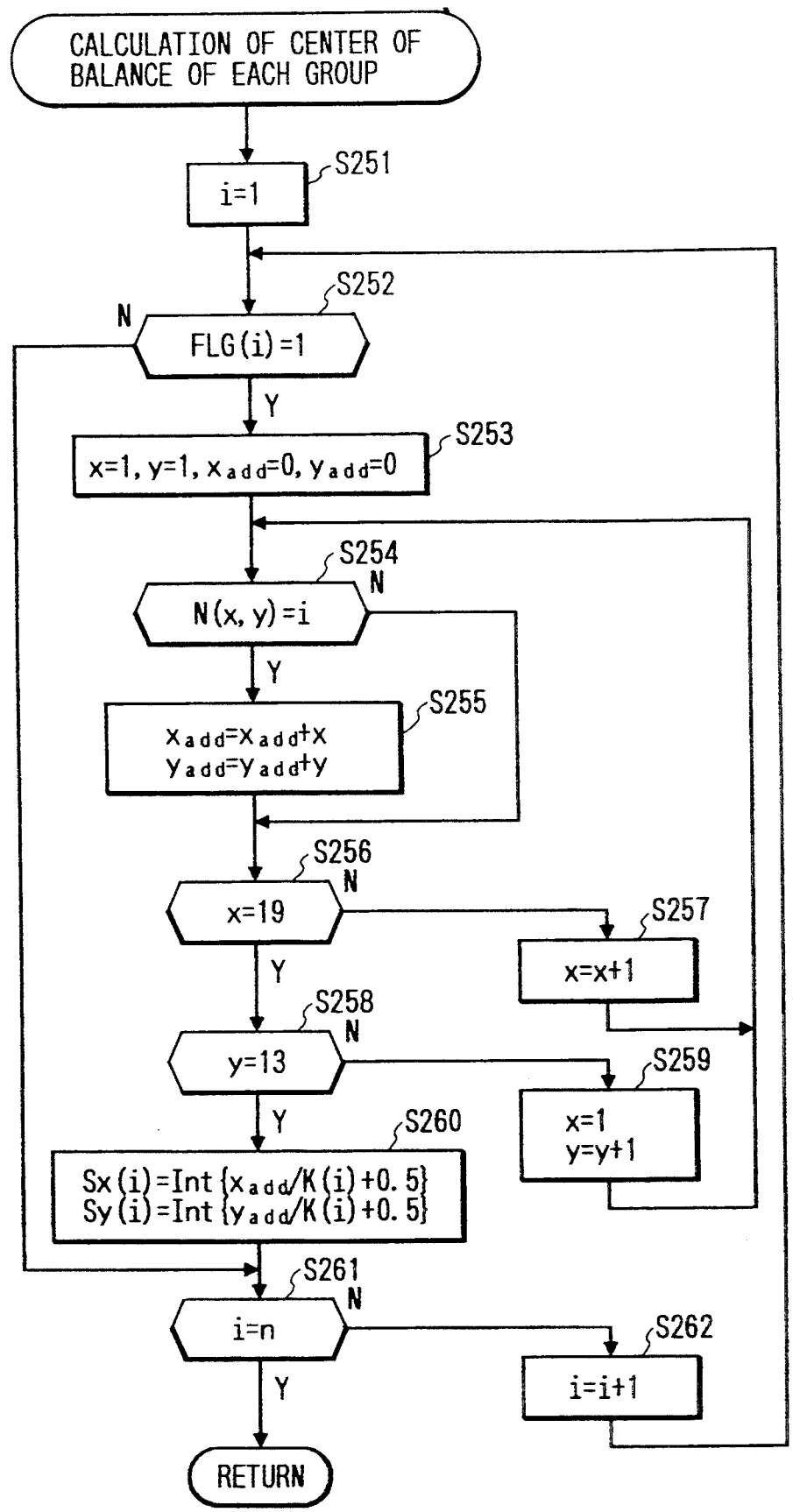
FIG. 14 is a flow chart showing in detail a subroutine for calculating the position (Sx, Sy) of the center of balance of each group in step S250 shown in FIG. 4.

FIG. 14 shows the detailed content of a subroutine for calculating the position (Sx(i),Sy(i)) of the center of balance of each group in step S250 shown in FIG. 4. In step S251, i=1 is set. In step S252, it is checked if FLG(i)=1, i.e., the group number i is valid. If Y in step S252, x=1, y=1, $x_{add}$=0, and $Y_{add}$=0 are set in step S253, and processing in step S254 is then executed.

It is checked in step S254 if the group number of a pixel at the address (x,y) is i. If Y in step S254, processing in step S255 is executed; otherwise, the flow jumps to step S256. In step S255, processing for respectively adding x and y to $x_{add}$ and $y_{add}$ is executed. If it is determined in step S256 that x=19, it is checked in step S258 if y=13. If N in step S256, x is incremented in step S257, and the flow returns to step S254.

If N in step S258, x=1 is set and y is incremented in step S259. Thereafter, the flow returns to step S254. However, if Y in step S258, the coordinates Sx(i) and Sy(i) of the position of the center of balance of an ith group are calculated in step S260. It is then checked in step S261 if i=n.

If N in step S261, i is incremented in step S262, and the flow returns to step S252; otherwise, the processing of this subroutine is ended.

Figure 15:
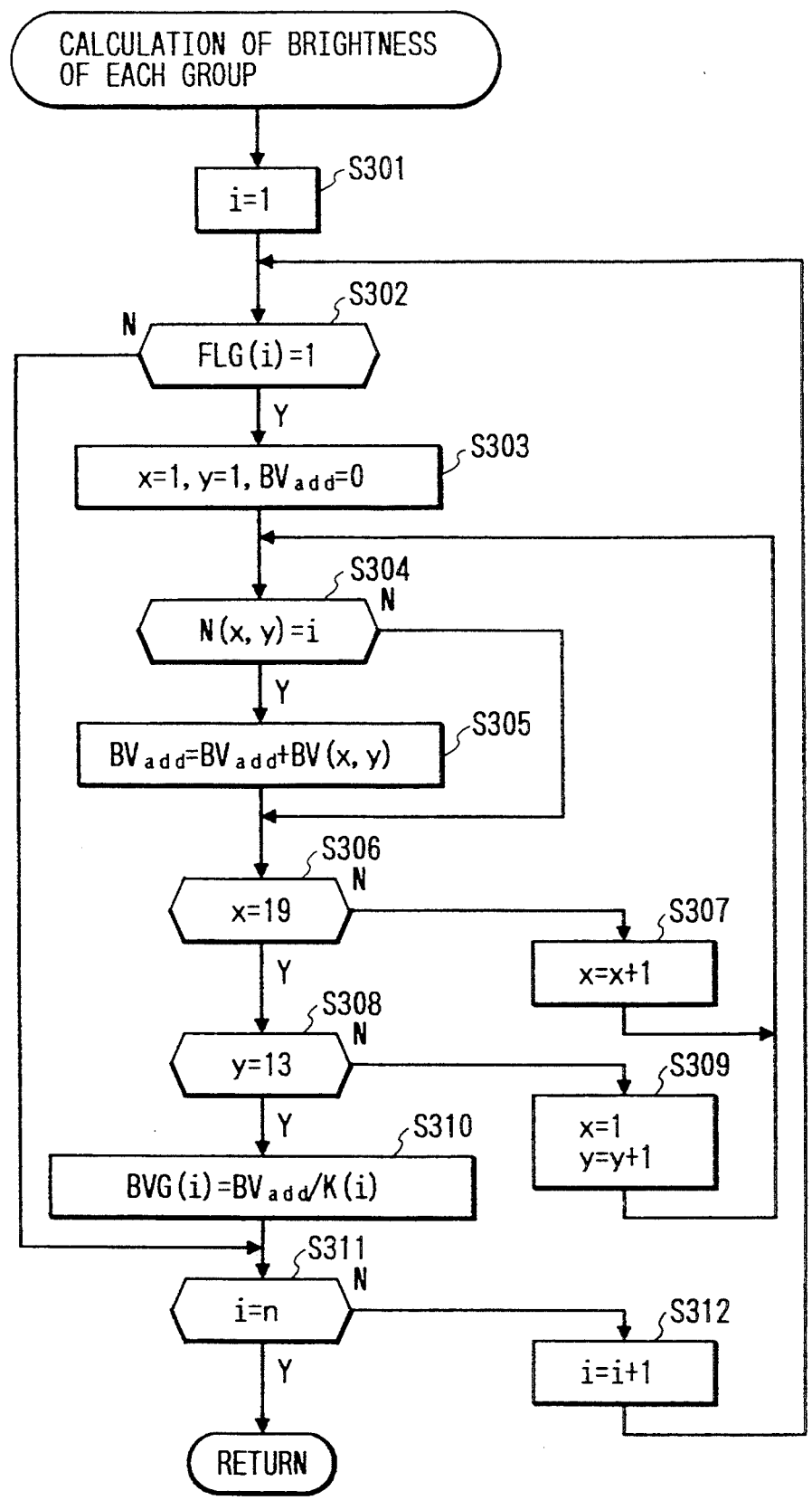
FIG. 15 is a flow chart showing in detail a brightness calculation subroutine in step S300 shown in FIG. 4.

FIG. 15 shows the detailed content of a subroutine for calculating a brightness value BVG(i) of each group in step S300 shown in FIG. 4. In step S301, i=1 is set. In step S302, it is checked if FLG(i)=1, i.e., if the group number is valid. If Y in step S302, x=1, y=1, and $BV_{add}$=0 are set in step S303, and processing in step S304 is executed.

In step S304, if the group number of a pixel at the address (x,y) is i. If Y in step S304, processing in step S305 is executed; otherwise, the flow jumps to step S306. In step S305, processing for adding BV(x,y) to $BV_{add}$ is executed. If it is determined in step S306 that x=19, it is checked in step S308 if y=13. If N in step S306, x is incremented in step S307, and the flow returns to step S304.

If N in step S308, x=1 is set in step S309, and y is incremented in step S309. The flow then returns to step S304. If Y in step S308, the coordinates Sx(i) and Sy(i) of the position of the center of balance of the ith group are calculated in step S310. It is then checked in step S311 if i=n.

If N in step S311, i is incremented in step S312, and the flow returns to step S302; otherwise, the processing of this subroutine is ended.

Figure 16:
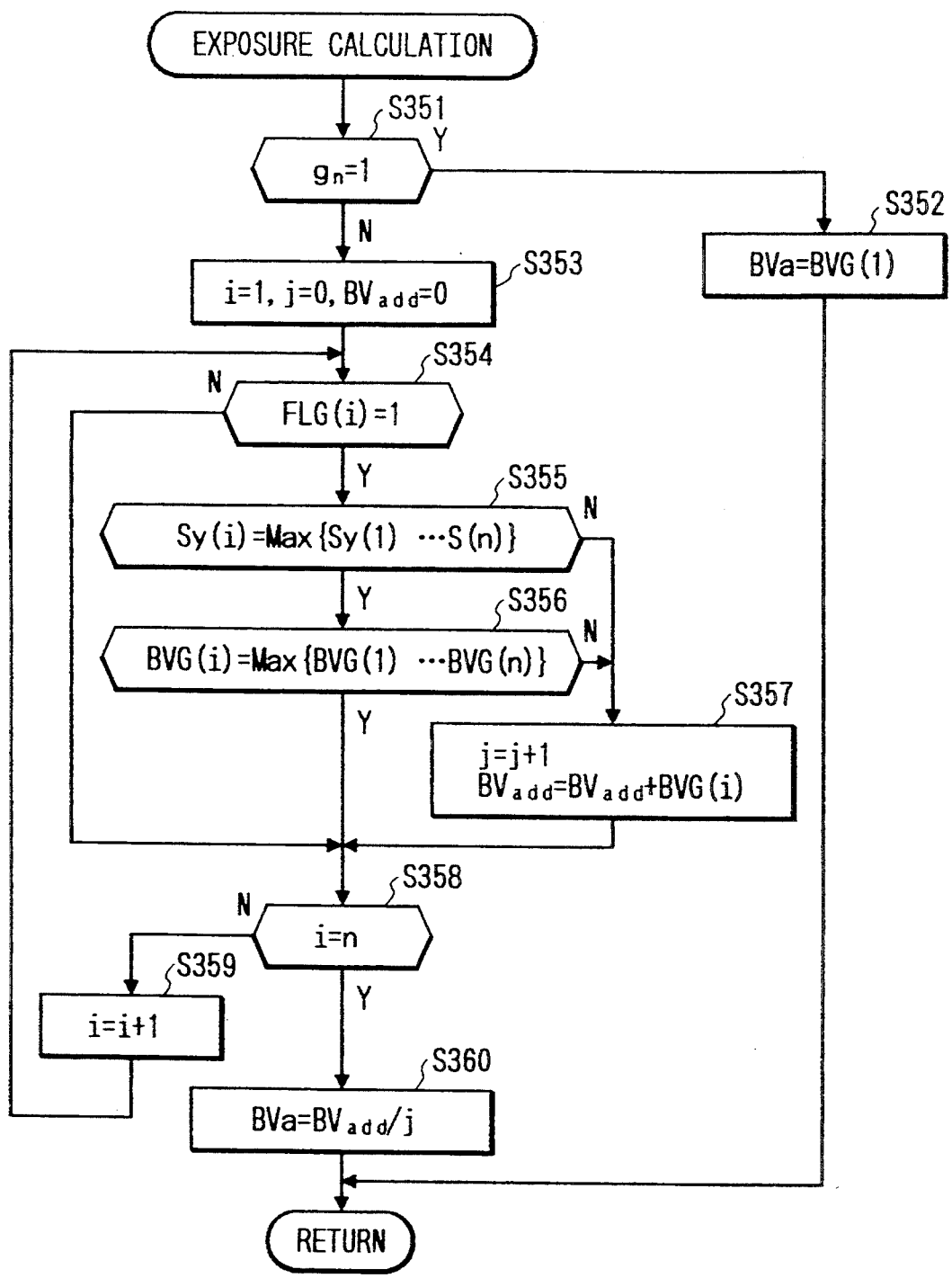
FIG. 16 is a flow chart showing in detail an exposure calculation subroutine in step S350 shown in FIG. 4.

FIG. 16 shows the detailed content of the exposure calculation subroutine in step S350 shown in FIG. 4. If it is determined in step S351 that the number gn of valid groups is 1, BVG(1) is given as an exposure value BVa in step S352. If it is determined in step S351 that the number gn of valid groups is not 1, i is set and j and $BV_{add}$ are reset in step S353. Then, processing in step S354 is executed. Note that i is the number of groups (the number of loops), and j is the number of groups contributing to an exposure calculation.

It is checked in step S354 if FLG(i)=1, i.e., the ith group is valid. If Y in step S354, processing in step S355 is executed; otherwise, the flow jumps to step S358. In step S355, it is checked if Sy(i) is the maximum value of {Sy(1) . . . Sy(n)}, i.e., if the position of the center of balance of Sy(i) corresponds to the uppermost position of the frame.

If Y in step S355, it is further checked in step S356 if BVG(i) is the maximum value of {BVG(1) . . . BVG(n)}. If Y in step S356, processing in step S358 is executed; otherwise, processing in step S357 is executed. In step S357, j is incremented, and a value obtained by adding BVG(i) to $BV_{add}$ is defined as new $BV_{add}$.

It is checked in step S358 if i=n. If N in step S358, i is incremented in step S359, and the flow returns to step S354. If Y in step S358, BVa as an exposure value is calculated in step S360. In this case, as can be seen from steps S355 and S356, a group whose position of the center of balance corresponds to the uppermost position, and which gives the maximum brightness value is considered as a background such as the sky, and is excluded from the calculation of an exposure value.

As a result, when a light metering operation of objects shown in FIG. 3A is performed, the objective field is divided into the group 1 as the background, and the groups 2 and 3 as objects. Thus, the background is excluded, and light metering calculations are performed for only the objects.

As described above, according to the present invention, in a light metering calculation apparatus for calculating an optimal exposure value of an object to be photographed, the objective field is divided into a plurality of regions, and a light metering operation is performed in units of regions. The light metering output values are compared, and the adjacent light metering regions having similar brightness values are processed as a group. Unlike in the conventional apparatus in which light metering regions to be grouped have a predetermined pattern, an accurate brightness distribution can be effectively measured regardless of the shapes of objects.

Another embodiment of the present invention will be described hereinafter.

Figure 17:
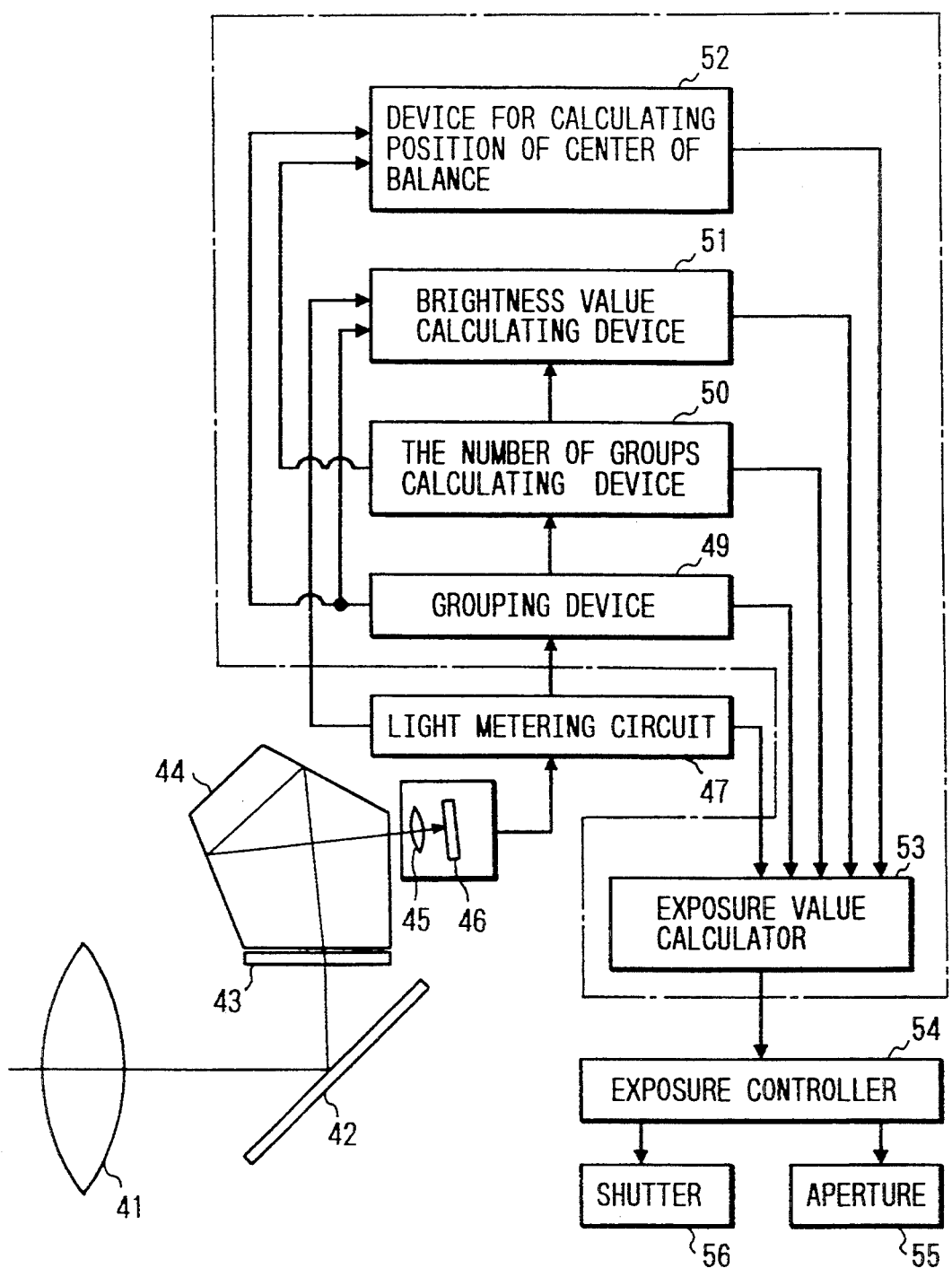
FIG. 17 is a diagram showing an exposure calculation apparatus for a camera according to another embodiment of the present invention.

FIG. 17 is a block diagram showing the overall arrangement of another embodiment of an exposure calculation apparatus for a camera according to the present invention. Some components of object light input into a camera main body through a photographing lens 41 are reflected upward by a main mirror 42, and some components of the reflected light are observed at an eyepiece lens (not shown) through a focusing screen 43 and a pentagonal prism 44, which constitute a finder optical system. The remaining components of the reflected light are received by a light metering element 46 through a light metering lens 45. The light metering element 46 outputs three light metering outputs R, G, and B, as will be described in detail later, and these outputs are input to a light metering circuit 47. The light metering circuit 47 calculates and outputs a brightness value according to the input signals.

Figure 18:
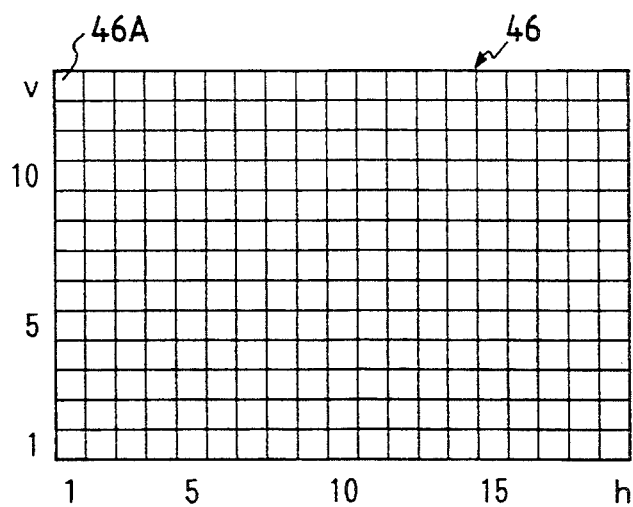
FIG. 18 is an enlarged view showing an arrangement of a light metering element.
Figure 19A:
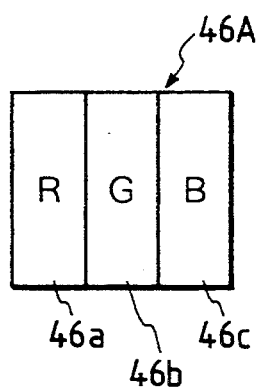
FIGS. 19A and 19B are enlarged views showing two arrangements of divided elements constituting the light metering element.
Figure 20A:
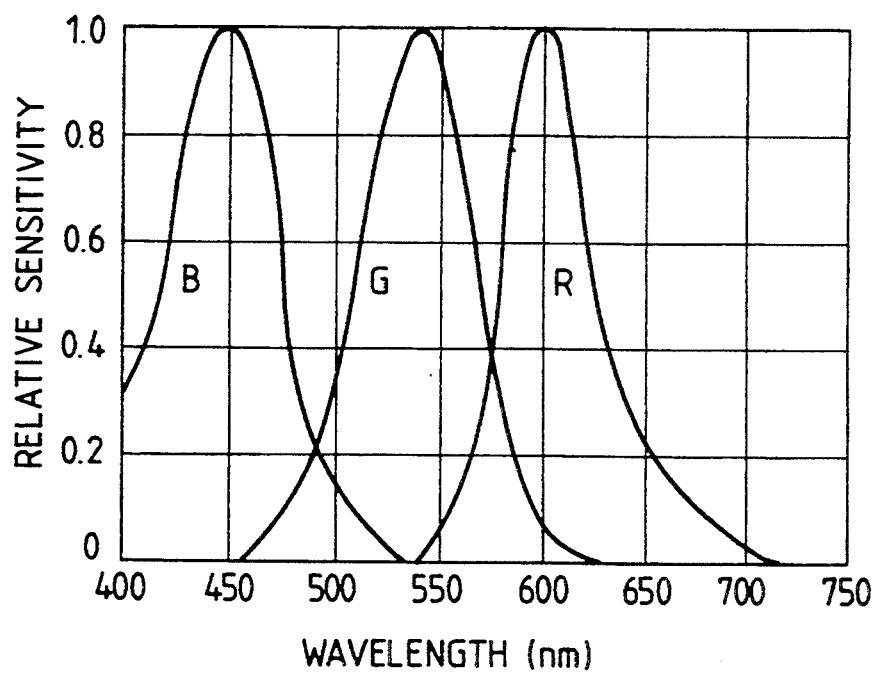
FIGS. 20A and 20B are graphs showing characteristics of a filter attached to the light metering element.
Figure 20B:
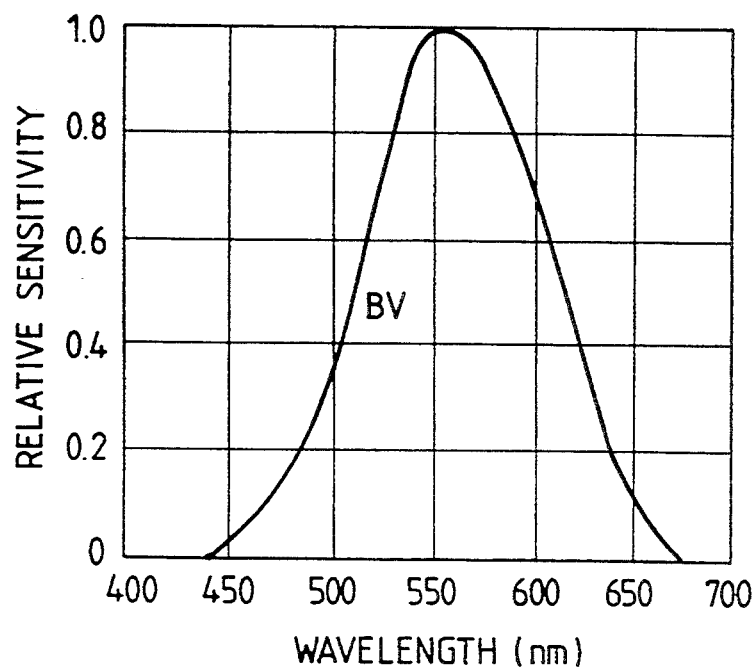

FIG. 18 is an enlarged view of the light metering element 46. The light metering element 46 is divided into 13 (vertical direction)×19 (horizontal direction), i.e., a total of 247 divided elements 46A. These divided elements 46A respectively correspond to 247 divided light metering regions obtained by dividing an objective field. As shown in FIG. 19A, each divided element 46A is further divided into three sections 46a, 46b, and 46c, and filters having wavelength characteristics R, G, and B, as shown in FIG. 20A, are respectively attached to these sections. These wavelength characteristics are the same as sensitivity characteristics of three primary color filters used in, e.g., a color television. The light metering circuit 47 calculates a sensitivity distribution BV shown in FIG. 20B using the outputs R, G, and B (corresponding to light metering signals) of the divided elements 46A as follows:

$$BV = 0.30R + 0.59G + 0.11B \quad (1)$$

BV corresponds to a brightness value.

Figure 21:
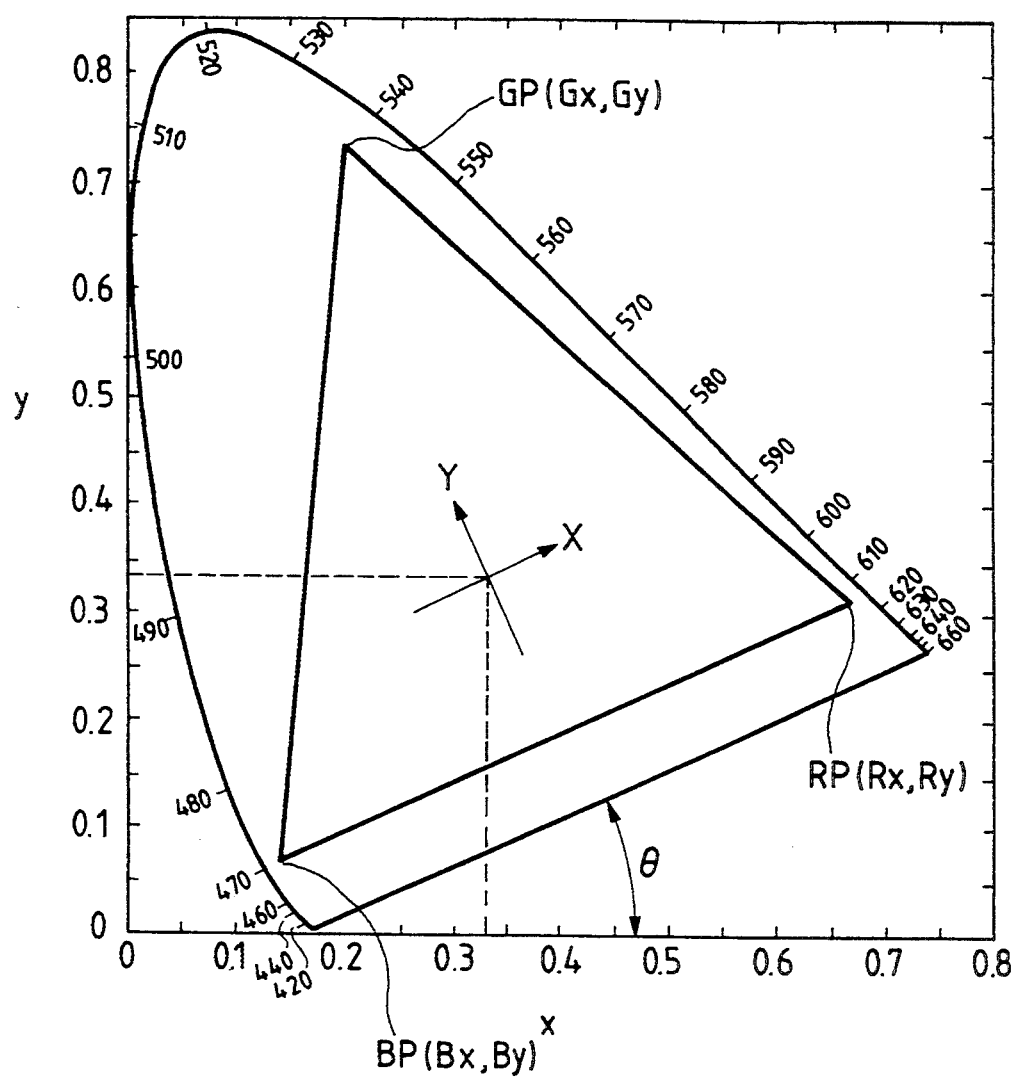
FIG. 21 is an x-y chromaticity diagram.

FIG. 21 shows a generally known x-y chromaticity diagram. In this x-y chromaticity diagram, if three points GP(Gx,Gy), BP(Bx,By), and RP(Rx,Ry) are set in advance according to the filter characteristics of the light metering element 46, and x and y are calculated using the following equations from the light metering signals R, G, and B:

$$x = R/(R+G+B) \quad (2)$$

$$y = G/(R+G+B) \quad (3)$$

then, an object color of a region corresponding to each divided element 46A can be detected based on the position (x,y) in a triangle defined by connecting the above-mentioned three points.

Figure 22:
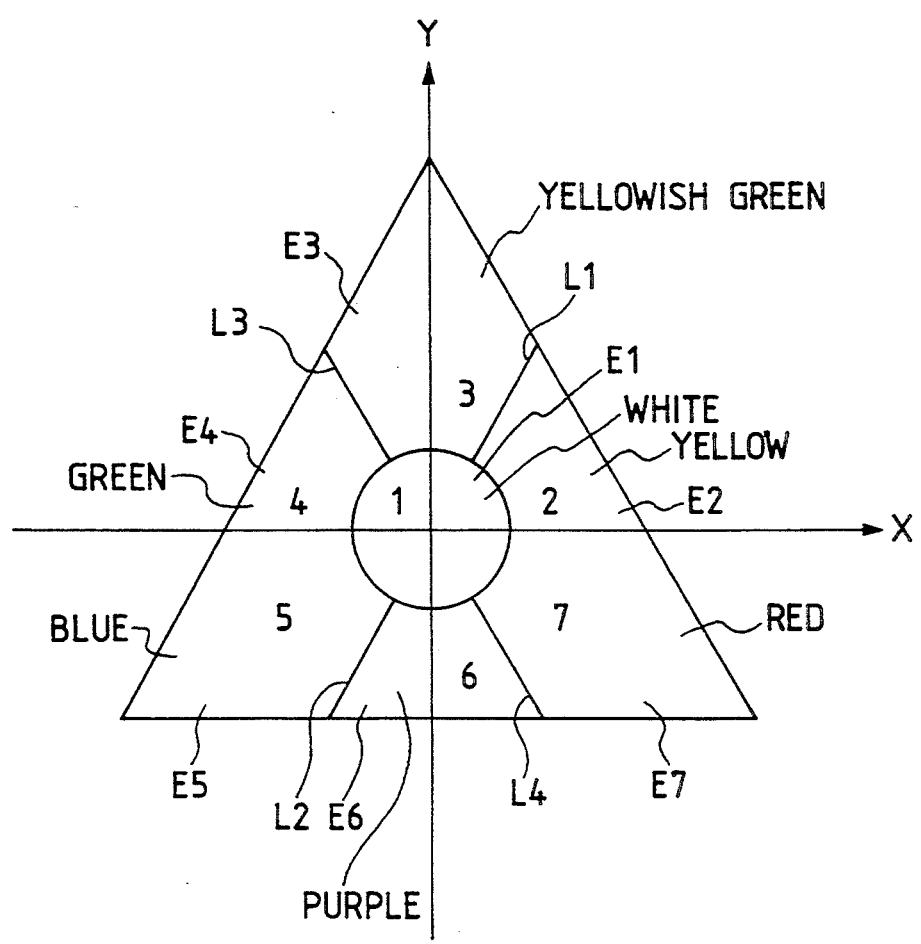
FIG. 22 is a chart showing the positional relationship among respective color areas.

More specifically, assuming an X-Y coordinate system (FIG. 22) obtained by rotating this triangle about a point (0.33, 0.33) through $\theta$, the interior of the triangle can be divided into seven areas (a white area E1, a yellow area E2, a yellowish green area E3, a green area E4, a blue area E5, a purple area E6, and a red area E7), as shown in FIG. 22. A circle partitioning the white area E1 is given by $X^2 + y^2 = r^2$ (e.g., r=1.15), lines L1 and L2 are given by, e.g., $Y = \sqrt{3}$, and lines L3 and L4 are given by. $Y = -\sqrt{3}$. Numerals in the respective areas represent color numbers, and are used in processing to be described later.

The X- and Y-coordinates on this X-Y coordinate system can be calculated as follows using the above x and y:

$$X = (x - 0.33)\cos\theta + (y - 0.33)\sin\theta \quad (4)$$

$$Y = -(x - 0.33)\sin\theta + (y - 0.33)\cos\theta \quad (5)$$

$$(\text{For } \sin\theta = (Ry - By)/\sqrt{\{(Rx - Bx)^2 + (Ry - By)^2\}}\ )$$

When the calculated coordinate position (X,Y) is included in, e.g., the yellow area E2, it can be determined that an object color is yellow.

Figure 19B:
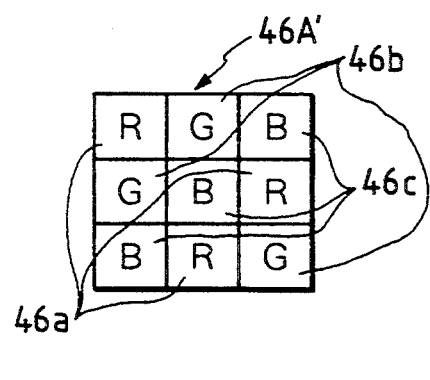

In FIG. 22, the triangle is defined as a regular triangle for the sake of simplicity. However, the triangle may not often become a regular triangle depending on filter characteristics. Since the above-mentioned divided element 46A is divided into sections 46a, 46b, and 46c from the left side in FIG. 19A, the sections 46a to 46c cannot measure exactly the same portion. However, since the light metering element is divided very finely, as shown in FIG. 18, the positional shift amounts of the sections 46a, 46b, and 46c are very small, and there is no problem if these sections are considered to measure the same portion. Furthermore, if the element 46A is divided in a checkerboard pattern, as indicated by 46A' in FIG. 19B, a shift in light metering portion due to a color difference can be further reduced.

In FIG. 17, a controller 48 is constituted by a grouping device 49 for grouping the plurality of divided elements 46A, i.e., light metering regions on the basis of light metering signals from the light metering circuit 47 under a condition that regions to be grouped are adjacent to each other and include an object in a similar color, a number of groups calculating device 50 for calculating the number of groups according to an output from the grouping device 49, a brightness value calculating device 51 for obtaining an average brightness value of each group grouped based on the output from the light metering circuit 47, a device 52 for calculating the position of the center of balance of each group in the objective field, and an exposure value calculator 53 for calculating an exposure value based on the outputs from these devices. An exposure controller 54 drives an aperture 55 and a shutter 56 on the basis of the exposure value calculated by the exposure value calculator 53, thereby performing a photographing operation.

The exposure calculation control sequence by the controller 48 will be described below with reference to the flow charts shown in FIGS. 23 to 30 and in FIGS. 32 to 36.

Figure 23:
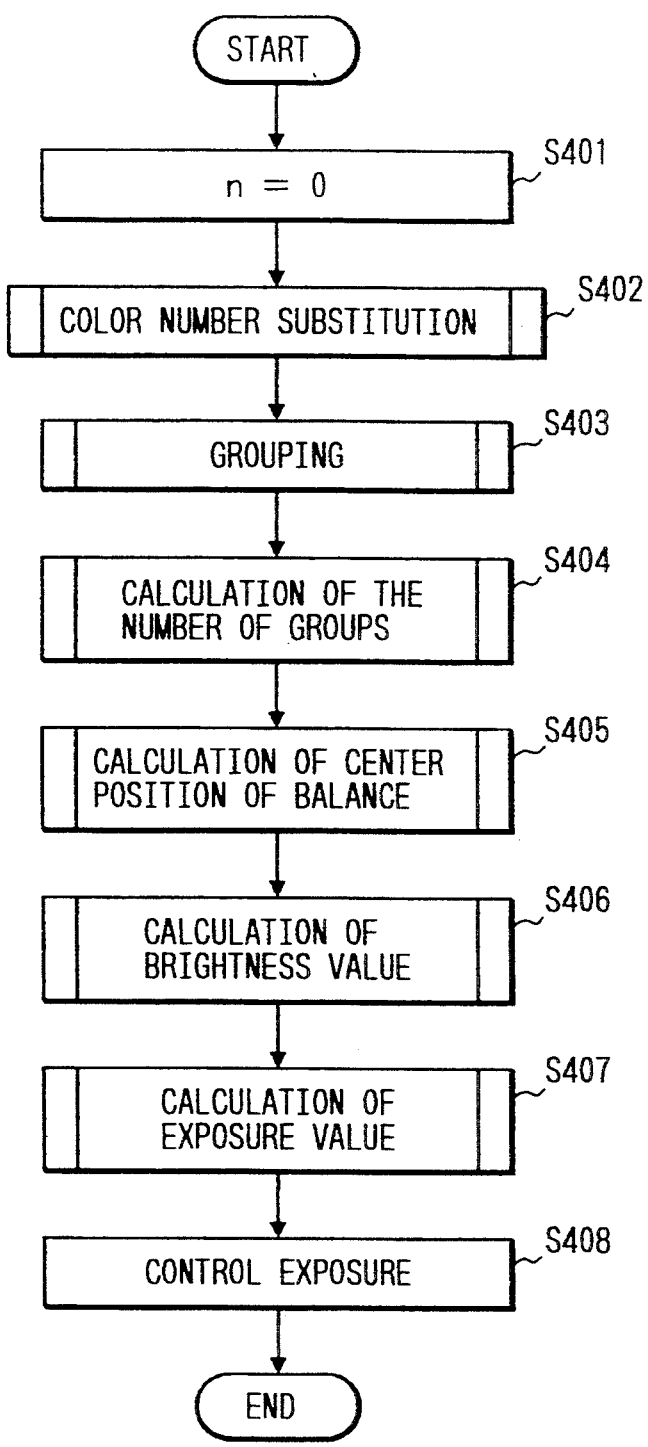
FIG. 23 is a main flow chart showing a processing sequence.

FIG. 23 shows a main program, and FIGS. 24 to 30 and FIGS. 32 to 36 show subroutine programs showing detailed processing operations. When a release button (not shown) is operated, the program shown in FIG. 23 is started. In step S401, a variable n for counting the number of groups is reset to 0. Thereafter, color number substitution processing (step S402), grouping 10 processing (step S403), processing for calculating the number of groups (step S404), processing for calculating the position of the center of balance (step S405), brightness value calculation processing (step S406), exposure value calculation processing (step S407), and exposure control processing (step S408) are executed in turn. Thereafter, the processing is ended.

Figure 24:
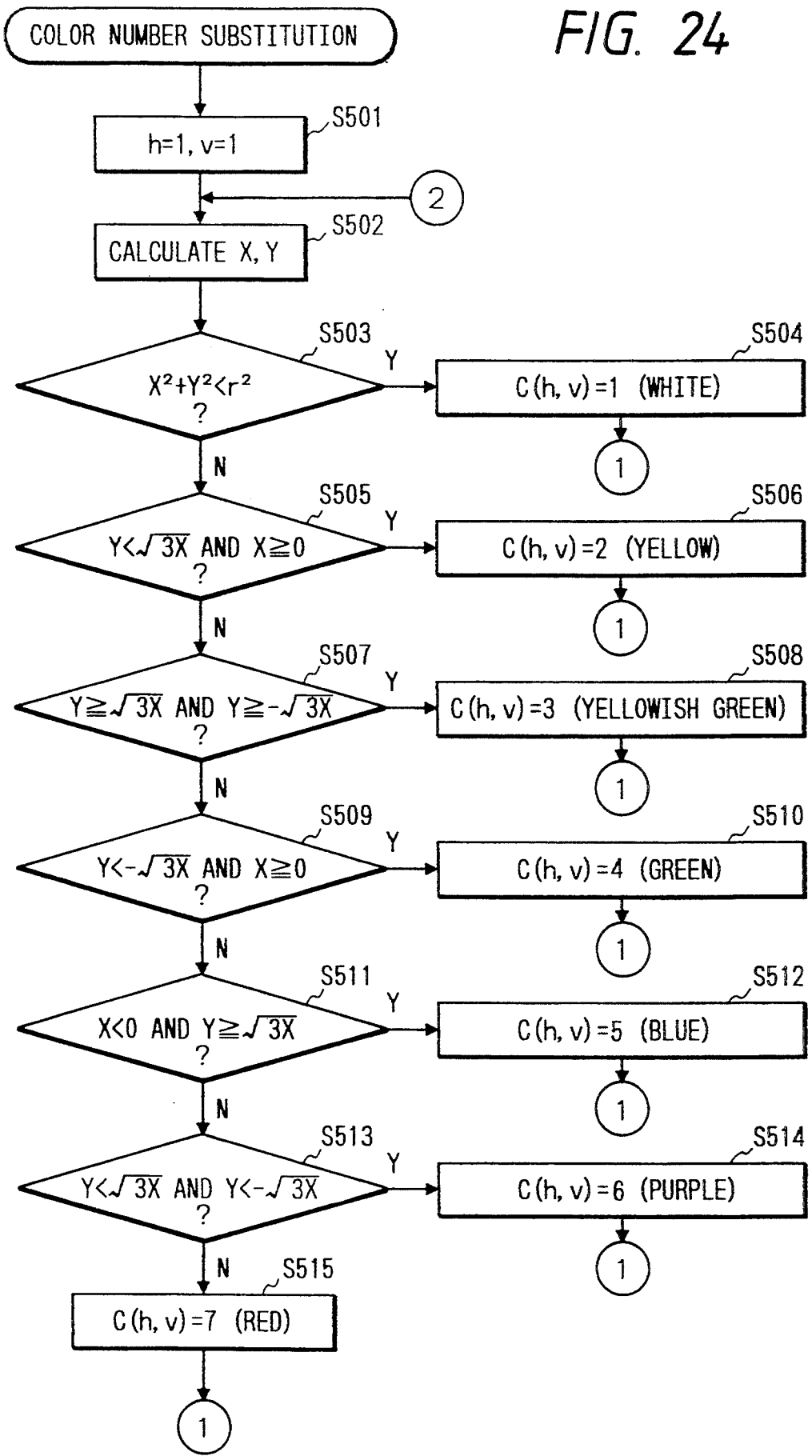
FIG. 24 is a flow chart showing in detail a color number substitution subroutine.
Figure 25:
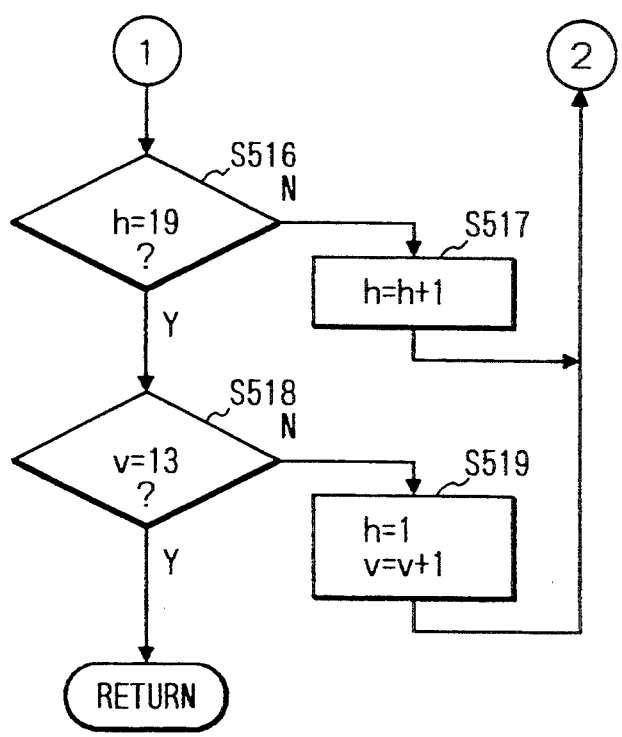
FIG. 25 is a flow chart following FIG. 24.

FIGS. 24 and 25 are flow charts showing in detail the color number substitution processing in step S402. This processing, and the next grouping processing are executed under the control of the grouping device 49.

The processing content of this subroutine is to substitute object colors (color numbers) corresponding to the above-mentioned 247 divided light metering elements 46A in a variable C(h,v). In step S501 in FIG. 24, variables h and v are respectively reset to "1". In step S502, light metering signals R(h,v), G(h,v), and B(h,v) corresponding to h and v of the light metering signals from the plurality of light metering elements 46A are read through the light metering circuit 47, and X and Y are calculated using equations (2) to (4) described above.

Note that h represents the horizontal addresses of the divided light metering elements 46A shown in FIG. 18, and assumes values 1, 2, ..., 19 from the left to the right in FIG. 18. Similarly, v represents the vertical addresses, and assumes values 1, 2, ..., 13 from the lower end to the upper end in FIG. 18. More specifically, light metering signals corresponding to, e.g., the most lower left light metering element 46A are R(1,1), G(1,1), and B(1,1), and light metering signals corresponding to the most upper right light metering element 46A are R(19,13), G(19,13), and B(19,13).

In step S503, it is checked if $X^2 + Y^2 < r^2$. This step is executed to determine whether or not the X and Y fall within a circle shown in FIG. 22, i.e., within the white area E1. If Y in step S503, a color number "1" representing white is substituted in C(h,v) in step S504. If N in step S503, the flow advances to step S505 to check if $Y < \sqrt{3}X$ and $X \geq 0$. In this step, it is determined whether or not the X and Y are included in the yellow area E2. If Y in step S505, a color number "2" representing yellow is substituted in C(h,v) in step S506; otherwise, the flow advances to step S507.

In step. S507, whether or not $Y \geq \sqrt{3}X$ and $Y \geq -\sqrt{3}X$ is checked to determine if the X and Y are included in the yellowish green area E3. If Y in step S507, a color number "3" representing yellowish green is substituted in C(h,v) in step S508; otherwise, the flow advances to step S509. In step S509, whether or not $Y < -\sqrt{3}X$ and $X \geq 0$ is checked to determine if the X and Y are included in the green area E4. If Y in step S509, a color number "4" indicating green is substituted in C(h,v) in step S510; otherwise, the flow advances to step S511.

In step S511, whether or not $X < 0$ and $Y \geq \sqrt{3}X$ is checked to determine if the X and Y are included in the blue area E5. If Y in step S511, a color number "5" representing blue is substituted in C(h,v) in step S512; otherwise, the flow advances to step S513. In step S513, whether or not $Y < \sqrt{3}X$ and $Y < -\sqrt{3}X$ is checked to determine if the X and Y are included in the purple area E6. If Y in step S513, a color number "6" representing purple is substituted in C(h,v) in step S514; otherwise, the flow advances to step S515. In step S515, a color number "7" representing red is substituted in C(h,v).

After step S504, S506, S508, S510, S512, S514, or S515, the flow advances to step S516 shown in FIG. 25.

The color number substitution processing is executed until it is determined in step S516 that h=19 while incrementing h by 1 in step S517 in FIG. 25, i.e., for a column of divided elements 46A. If Y in step S516, h=1 is set, and v is incremented by 1 to perform the same processing as described above for the next column of divided elements 46A. If it is determined in step S518 that v=13, i.e., if color number substitution processing is performed for all the 247 divided elements 46A, the control returns to the routine shown in FIG. 23, and grouping processing in step S403 is executed.

FIGS. 26 to 30, and FIG. 32 are flow charts showing in detail grouping processing subroutines.

Figure 26:
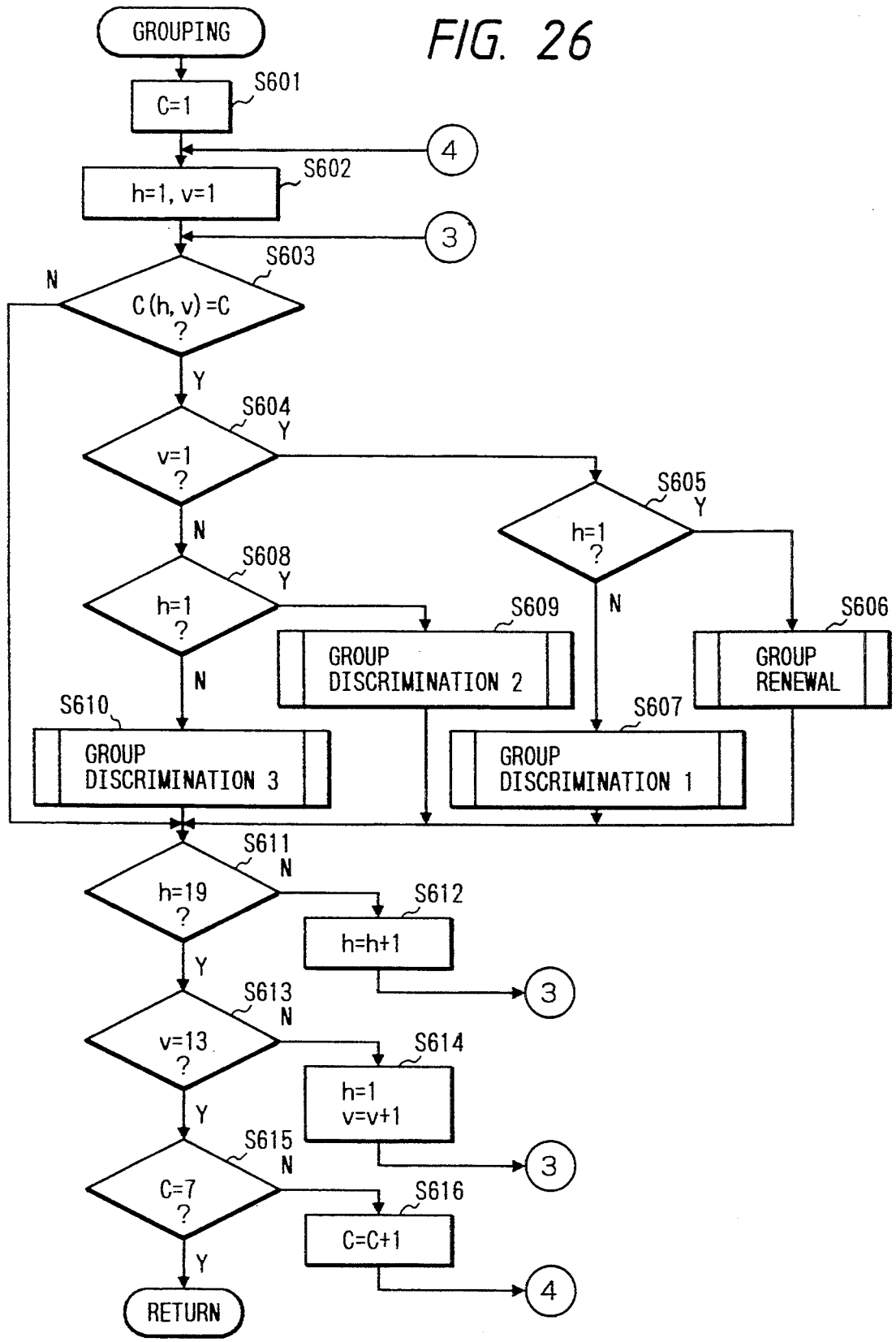
FIG. 26 is a flow chart showing in detail a grouping processing subroutine.

In FIG. 26, in step S601, the color number "1" is set in a variable C as an initial value. In step S602, h and v are reset to an initial value "1". In step S603, it is checked if C(h,v)=C. If N in step S603, the flow advances to step S611; otherwise, the flow advances to step S604. If it is determined in step S604 that v=1, and then if it is determined in step S605 that h=1, i.e., when processing is performed for the leftmost light metering element 46A in the lowermost row, the flow advances to step S606 to execute group renewal processing.

If it is determined in step S605 that h≠1, i.e., when processing is performed for a light metering element 46A, which is not the leftmost one although it is in the lowermost row, the flow advances to step S607 to execute group discrimination processing 1. Furthermore, if it is determined in step S604 that v≠1, and then, if it is determined in step S608 that h=1, i.e., when processing is performed for the leftmost light metering element 46A in a row other than the lowermost row, the flow advances to step S609 to execute group discrimination processing 2. If it is determined in step S608 that h≠1, i.e., when processing is performed for a light metering element 46A, which is neither the leftmost nor lowermost one, the flow advances to step S610 to execute group discrimination processing 3.

In the processing shown in FIG. 26, it is checked if an object in the left neighboring light metering region of a given region, and an object in the light metering region immediately below the given region have a color similar to that of the given region. If these objects have similar colors, the corresponding light metering regions are grouped into a single group. However, as for the leftmost element in the lowermost row, there is no element to be compared, and an element, which is not the leftmost one although it is in the lowermost row, can only be compared with its left neighboring element. Furthermore, the leftmost element in a row other than the lowermost row can only be compared with an element immediately therebelow. For these reasons, only the elements, which are neither the leftmost nor lowermost ones, can be compared with their left neighboring elements, and elements immediately therebelow. Therefore, different group discrimination processing modes are prepared depending on the positions of the divided light metering elements 46A, as described above.

Figure 27:
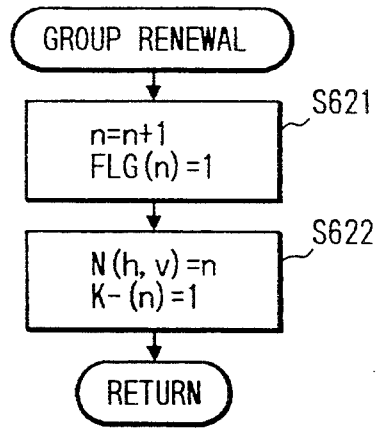
FIG. 27 is a flow chart showing in detail a group renewal subroutine.

FIG. 27 shows in detail the group renewal processing in step S606.

In step S621, a variable n for counting the number of groups is incremented by "1", and a flag FLG(n) is set to be 1. In step S622, n is substituted in a variable N(h,v), and "1" is substituted in a variable K(n). Thereafter, the control returns to the routine shown in FIG. 26. The flag FLG(n) is a variable for checking if a group number n is valid or invalid. If FLG(n)=1, the group number is valid; if FLG(n)=0, it is invalid. The reason why this flag is used will be described later. N(h,v) is a variable (to be referred to as a group number hereinafter) indicating a group to which a divided light metering element 46A at an address v belongs, and K(n) is a variable indicating the number of elements of a group n, i.e., the number of elements constituting the group.

Figure 28:
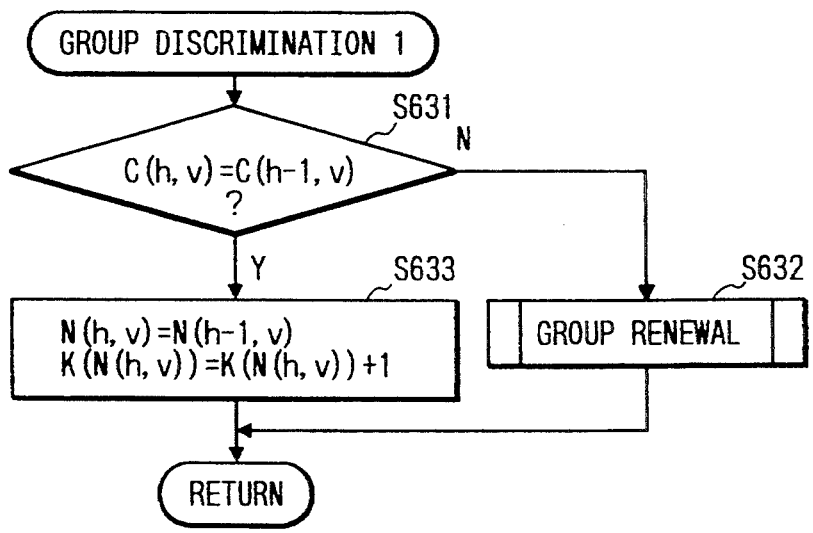
FIG. 28 is a flow chart showing in detail a group discrimination processing 1 subroutine.

FIG. 28 shows in detail group discrimination processing 1 in step S607 (FIG. 26).

This processing is executed when the corresponding light metering element is present in the lowermost row, and is not the leftmost one (it can be compared with only the left neighboring element). In step S631, it is checked if a color number C(h,v) associated with a given element 46A is equal to a color number C(h−1,v) of its left neighboring element 46A in FIG. 18. If Y in step S631, N(h,v)=N(h−1,v) is set in step S633. This processing is to set the group number of the given element to be equal to that of its left neighboring element. In step S633, the number K(N(h,v)) of elements of the group n is incremented by one, and thereafter, the control returns to the routine shown in FIG. 26. On the other hand, if N in step S631, the above-mentioned group renewal processing shown in FIG. 27 is executed in step S632, and then, the control returns to the routine shown in FIG. 26.

Figure 29:
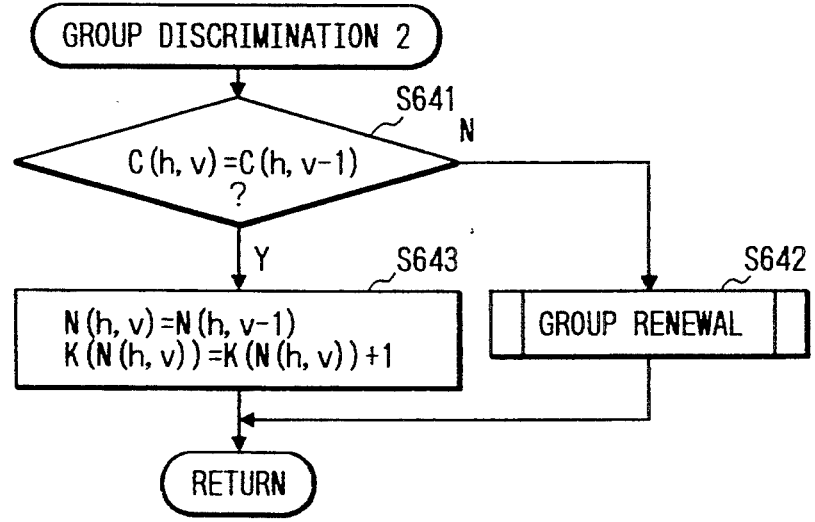
FIG. 29 is a flow chart showing in detail a group discrimination processing 2 subroutine.

FIG. 29 shows in detail group discrimination processing 2 in step S609 (FIG. 26).

This processing is executed when the corresponding divided light metering element 46A is present in a row other than the lowermost row, and is the leftmost one (it can be compared with only an element immediately therebelow). In step S641, it is checked if a color number C(h,v) associated with a given element 46A is equal to a color number (h,v−1) of an element 46A immediately therebelow. If Y in step S641, N(h,v)= N(h,v−1) is set in step S643. This processing is to set an object color corresponding to the given element 6A to be the same as that of the element 46A immediately therebelow. In step S643, the number K(N(h,v)) of elements of the group n is incremented by "1". Thereafter, the control returns to the routine shown in FIG. 26. On the other hand, if N in step S641, the group renewal processing shown in FIG. 27 is executed in step S642, and the control then returns to the routine shown in FIG. 26.

Figure 30:
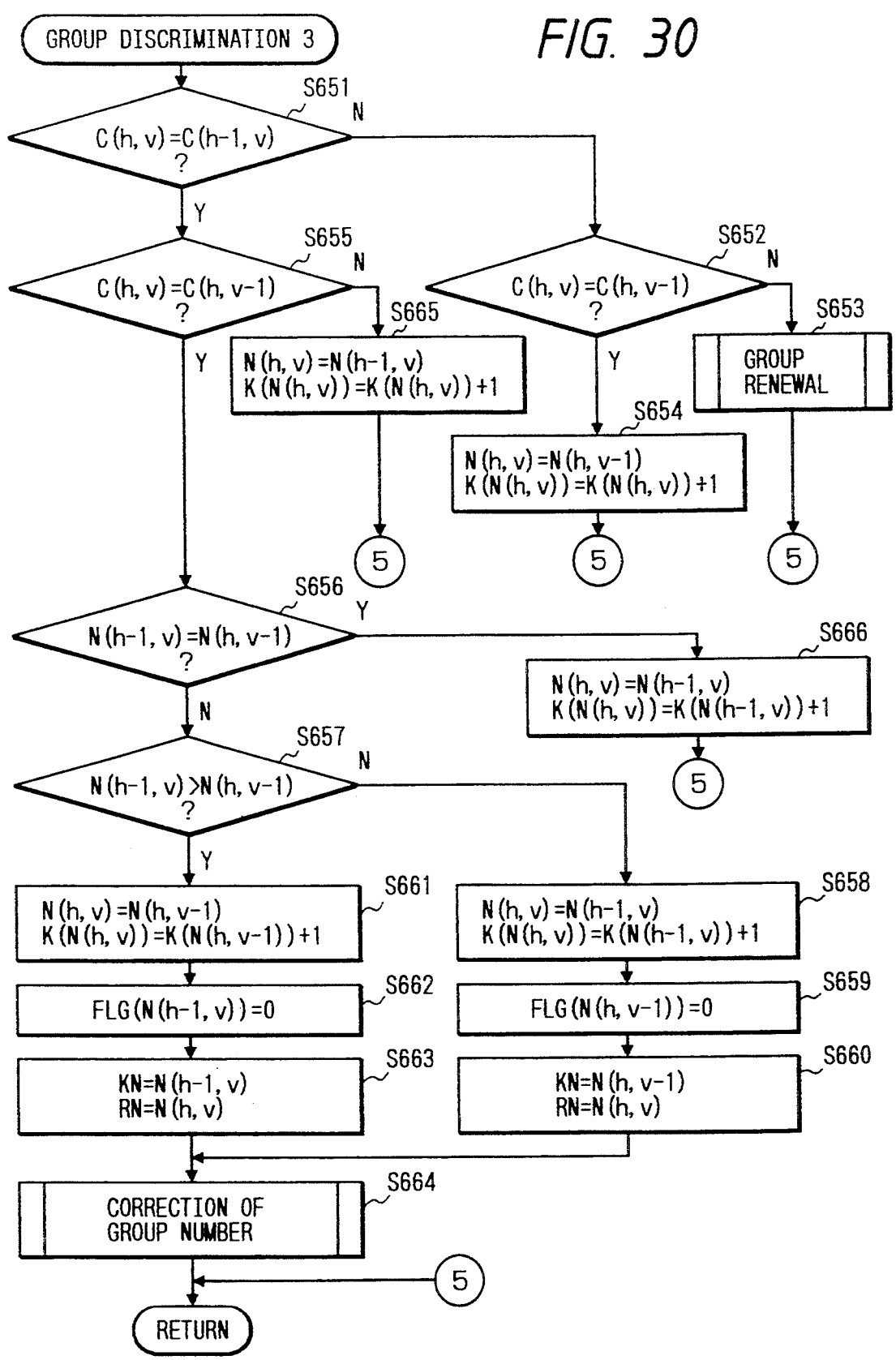
FIG. 30 is a flow chart showing in detail a group discrimination processing 3 subroutine.

FIG. 30 shows in detail group discrimination processing 3 in step S610.

This processing is executed when the corresponding light metering element is present in a row other than the lowermost row, and is not the leftmost one (it can be compared with its left neighboring element, and an element immediately therebelow). In step S651, it is checked if a color number C(h,v) associated with a given element is equal to a color number C(h−1,v) of its left neighboring element. If N in step S651, the flow advances to step S652 to check if the color number C(h,v) of the given element is equal to a color number C(h,v−1) of an element immediately therebelow. If N in step S652, the group renewal processing (FIG. 27) is executed in step S653, and the control returns to the routine shown in FIG. 26. If Y in step S652, the flow advances to step S654. In step S654, N(h,v)=N(h,v−1) is set, and the number K(N(h,v)) of elements of the group n is incremented by "1". If Y in step S651, the same checking operation as in step S652 is performed in step S655. If N in step S655, N(h,v)=N(h−1,v) is set, and the number K(N(h,v)) of elements of the group n is incremented by "1" in step S665.

If Y in step S655, the flow advances to step S656 to check if the group number of the left neighboring element 46A of the given element 46A is equal to the group number of the element 46A immediately below the given element 46A, i.e., if N(h,v) =N(h,v−1). If Y in step S656, N(h,v)=N(h−1,v), and K(N(h,v))=K(N(h−1,v))+1 in step S666. If N in step S656, the flow advances to step S657 to check if N(h,v)>N(h,v−1).

The reason why the checking processing in step S657 is performed will be described below with reference to FIG. 31.

Figure 31:
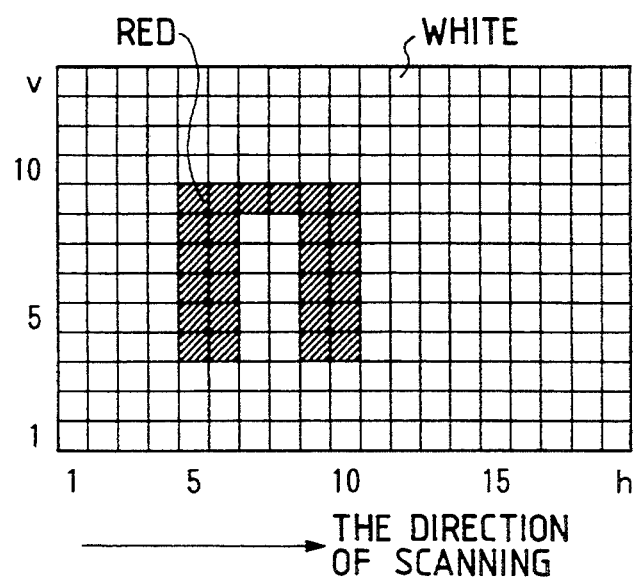
FIG. 31 is a view for explaining an example of group discrimination.

Assume that a substantially U-shaped object (e.g., red) is present in an objective field, and outputs from the elements 46A of the hatched portion indicate a similar color (red), as shown in FIG. 31. In this embodiment, since a scanning operation is performed from the element 46A of h=1 and v=1 to the right, as described above, when the scanning operation reaches an element of h=5 and v=4, an object having a different color is determined, and a new group number is given. Then, when the scanning operation reaches an element 46A of h=9 and v=4, another object having a different color is determined, and another group number is given. More specifically, the object of h=5 and v=4, and the object of h=9 and v=4 are connected at their upper portions, and are portions of an identical object (to be in the same group), in practice. However, this fact can be found only when the scanning operation reaches an element 46A of h=9 and v=9, and these objects are counted as different objects (groups) until then. Therefore, when this fact is found at the element of h=0 and v=9 (N is determined in step S656), the groups must be combined, and the group number must be corrected.

In this embodiment, since the group number is corrected to a smaller one in this case, the checking operation in step S657 is performed. If N in step S657, N(h,v)=N(h−1,v), and K(N(h,v))=K(N(h−1,v))+1 in step S658. Then, a flag FLG(N(h,v−1)) is set to be "0" in step S659. More specifically, since a smaller group number N(h−1,v) is employed, a larger group number N(h,v−1) becomes unnecessary, and is made invalid. In step S660, N(h,v−1) is substituted in a variable KN, and N(h,v) is substituted in a variable RN in step S660. Thereafter, the flow advances to step S664 to execute group number correction processing. The variable KN represents the group number to be deleted upon combination of the groups, and the variable RN represents the group number to be left.

On the other hand, if Y in step S657, N(h,v)=N(h,v−1), and K(N(h,v))=K(N(h,v−1))+1 in step S661. In step S662, a flag FLG(N(h−1,v)) is set to be "0". In step S663, N(h−1,v) is substituted in a variable KN, and N(h,v) is substituted in a variable RN. Thereafter, the flow advances to step S664 to execute group number correction processing.

Figure 32:
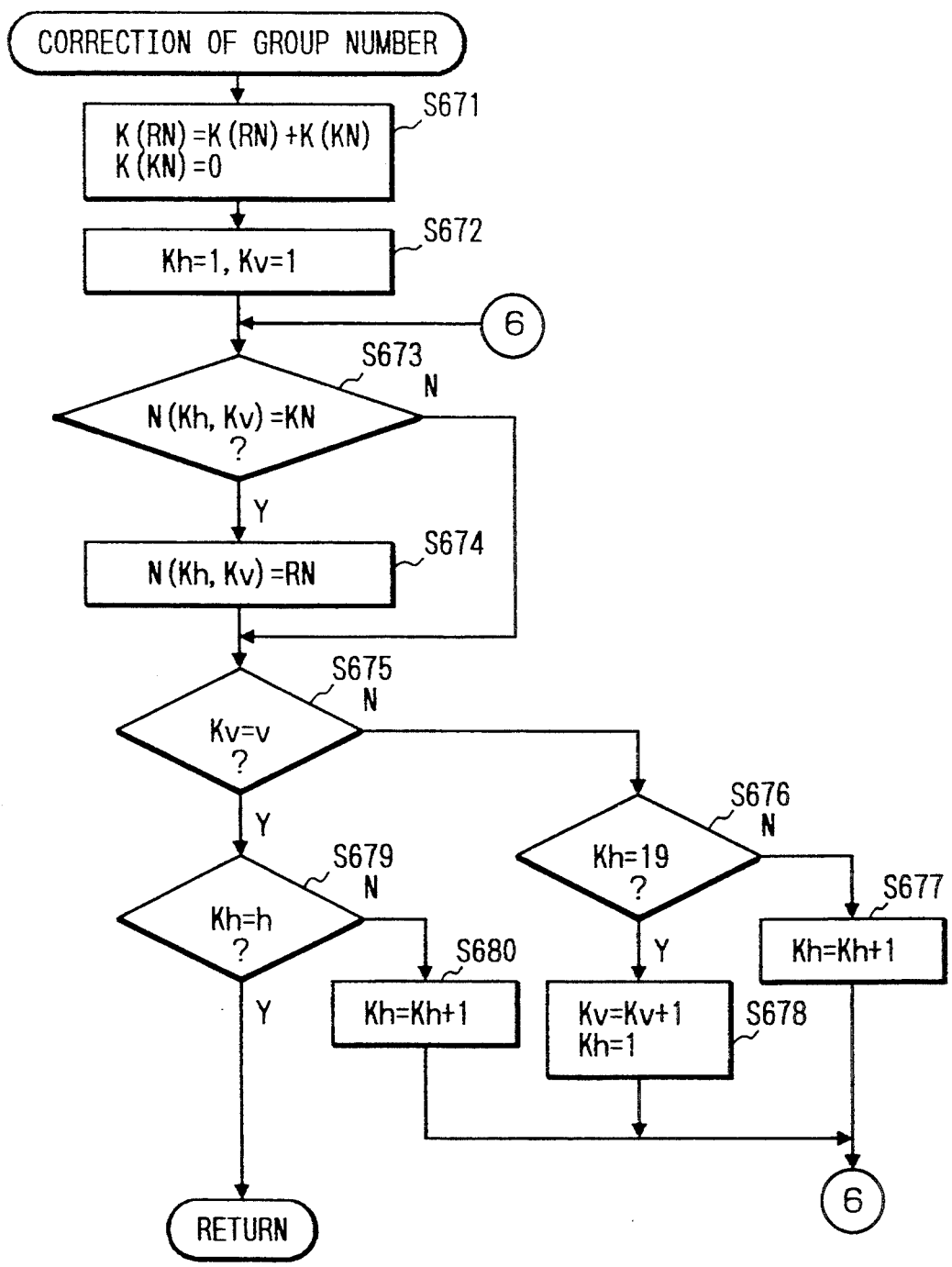
FIG. 32 is a flow chart showing in detail a group number correction processing subroutine.

FIG. 32 is a flow chart showing in detail the group number correction processing subroutine.

In step S671, K(RN)=K(RN)+K(KN), and then, K(KN)=0. More specifically, the number K(KN) of elements of a newly combined group is added to the current number K(RN) of elements to set a new number K(RN) of elements, and K(KN) is then reset to zero since it is unnecessary.

In step S672, variables Kh and Kv are respectively reset to "1". In step S673, it is checked if N(Kh,Kv) is the group number KN of the group to be deleted. If N in step S673, the flow advances to step S675; otherwise, the group number RN to be left is substituted in N(Kh,Kv) in step S674, and the flow advances to step S675. This processing is repetitively executed until Y is determined in step S679 via steps S675 to S680, i.e., up to an element 46A (Kh=h, Kv=v), which is being subjected to processing. If Y in step S679, the control returns to the routine shown in FIG. 30, and thereafter, returns to the routine shown in FIG. 26.

The processing operations in steps S603 to S610 shown in FIG. 26 are executed until Y is determined in step S613 via steps S611 to S614, i.e., for all the divided elements 46A. If Y in step S613, the flow advances to step S615. Then, the processing is executed until Y is determined in step S615 while incrementing the color number C in step S616, i.e., for all the color numbers. Thereafter, if Y in step S615, the control returns to the routine shown in FIG. 23.

The processing content of the grouping processing has been described. With this processing, elements, which are adjacent to each other and have a similar color, are grouped as one group, and a plurality of groups are formed according to colors in the objective field (one group is formed if the entire objective field is in a single color). Group numbers indicating groups to which the respective elements belong are given to the respective elements, and the number of elements is given to each group. Since the 247 divided light metering elements 46A correspond to the 247 light metering regions obtained by dividing the objective field, as described above, the grouping processing of the divided light metering elements 46A corresponds to that of the light metering regions.

Figure 33:
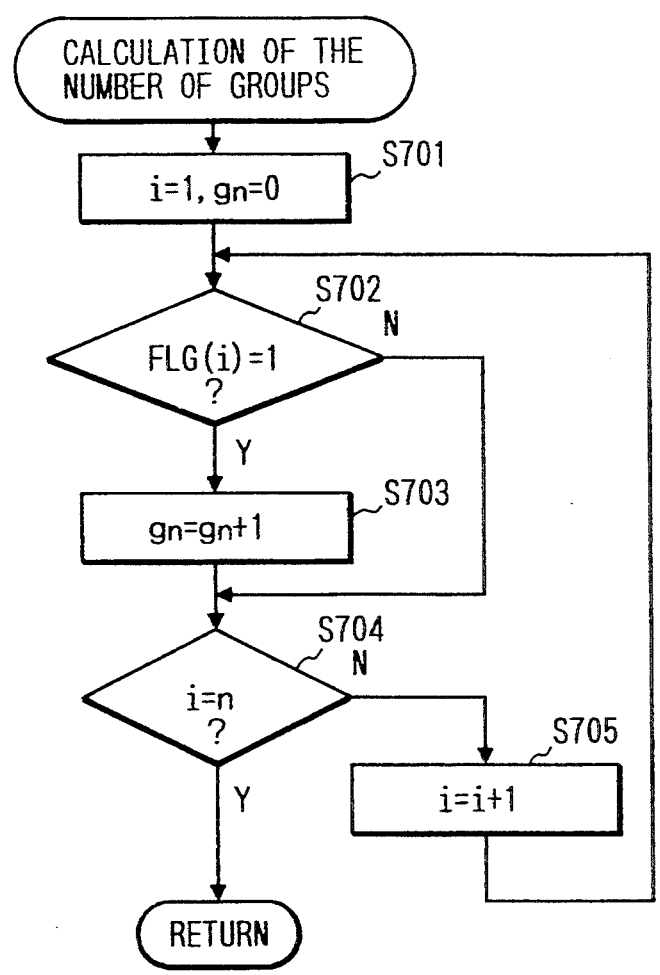
FIG. 33 is a flow chart showing in detail a subroutine for calculating the number of groups.

FIG. 33 is a flow chart showing in detail a subroutine for calculating the number of groups in step S404 (FIG. 23). This processing, and processing for calculating the position of the center of balance (to be described later) are executed under the control of the device 52.

With the above-mentioned processing, the number of groups is substituted in the variable n. However, this value includes a count of invalid groups. Thus, this processing is executed to calculate the true number of groups excluding that of invalid groups.

In step S701 in FIG. 33, a variable i is set to be "1", and a variable gn for counting the true number of groups is initialized to zero. In step S702, it is checked if a flag FLG(i) is 1, i.e., a group corresponding to i is valid. If N in step S702, the flow advances to step S704; otherwise, gn is incremented by "1" in step S703, and the flow advances to step S704. In step S704, it is checked if i=n. If N in step S704, i is incremented in step S705, and the flow returns to step S702; if Y in step S704, the control returns to the routine shown in FIG. 23. With the above-mentioned processing, the true number of groups can be substituted in gn.

Figure 34:
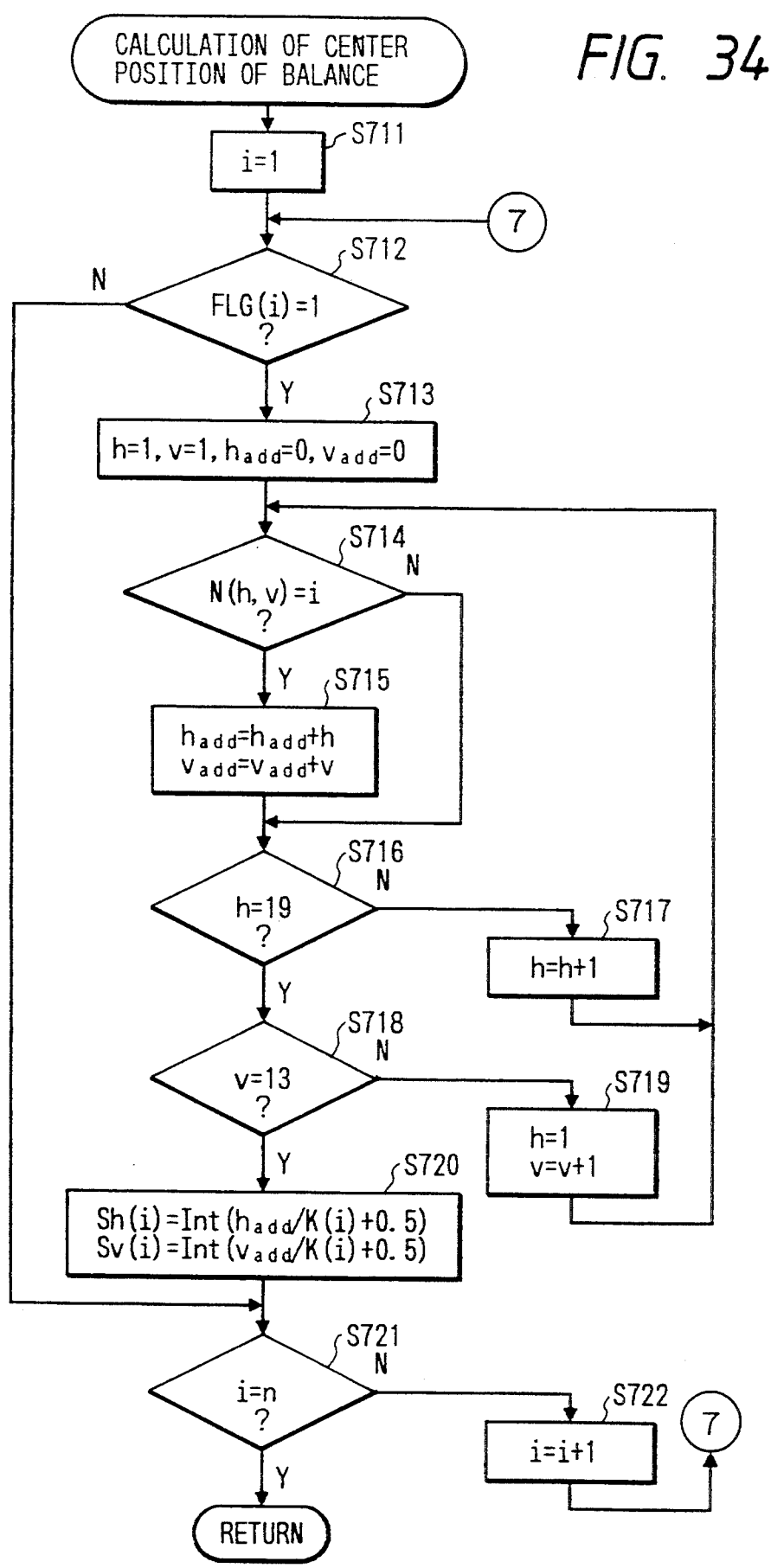
FIG. 34 is a flow chart showing in detail a subroutine for calculating the position of the center of balance.

FIG. 34 is a flow chart showing in detail a subroutine for calculating the position of the center of balance in step S405 (FIG. 23).

In step S711 in FIG. 34, i is initialized to 1. In step S712, it is checked if a flag FLG(h) is 1. If N in step S712 (i.e., the corresponding group is invalid), the flow advances to step S721; otherwise (if the corresponding group is valid), the flow advances to step S713. In step S713, initialization is performed to have h=1, v=1, $h_{add}$=0, and $v_{add}$=0. In step S714, it is checked if N(h,v)=i, i.e., if the group number of the corresponding element is i.

If N in step S714, the flow advances to step S716; otherwise, $h_{add}=h_{add}+h$, and $v_{add}=v_{add}+v$ are calculated in step S715, and the flow advances to step S716. The above processing is repeated until v=13 is determined in step S718, i.e., for all the elements. Thereafter, the coordinates of the position of the center of balance of the group corresponding to i with respect to the objective field are calculated in step S720 using the following equations:

$$Sh(i) = Int(h_{add}/K(i) + 0.5)$$

$$Sv(i) = Int(v_{add}/K(i) + 0.5)$$

where K(i) is the number of elements of the group, and Int represents the rounding function.

In step S721, it is checked if i=n, i.e., if the positions of the center of balance are calculated for all the groups. If N in step S721, i is incremented in step S722, and the flow returns to step S712; otherwise, the control returns to the routine shown in FIG. 23.

Figure 35:
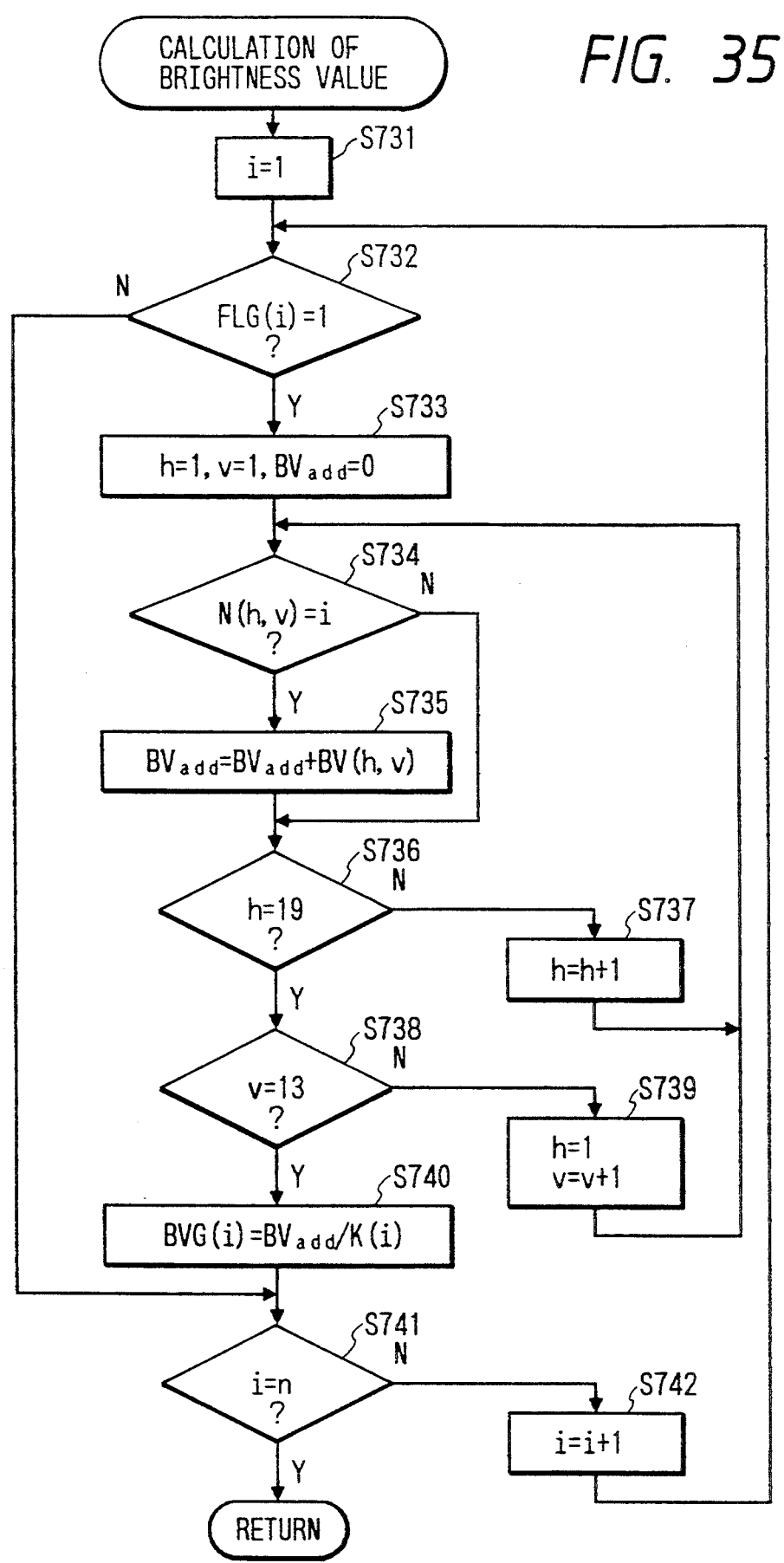
FIG. 35 is a flow chart showing in detail a brightness calculation processing subroutine.

FIG. 35 is a flow chart showing in detail a brightness value calculation processing subroutine in step S406 (FIG. 23). This processing is executed under the control of the brightness value calculating device 51.

As shown in FIG. 35, in step S731, i is initialized to 1. In step S732, it is checked if a flag FLG(i)=1. If N in step S732, the flow advances to step S741; otherwise, the flow advances to step S733. In step S733, initialization is performed to have h=1, v=1, and $BV_{add}$=0. In step S734, it is checked if N(h,v)=i.

If N in step S734, the flow advances to step S736; otherwise, $BV_{add}$ is calculated in step S735 as follows:

$$BV_{add} = BV_{add} + BV(h,v)$$

where BV(h,v) is the value representing the brightness value of each light metering region, and calculated by the light metering circuit 47 according to equation (1) described above on the basis of the light metering signals B, G, and R from the corresponding divided light metering element 46A.

This processing is executed until v=13 is determined in step S738, i.e., for all the elements 46A. Thereafter, in step S740, an average brightness value BVG(i) of a group corresponding to i is calculated as follows:

$$BVG(i) = BV_{add}/K(i)$$

In step S741, it is checked if i=n, i.e., if the average brightness values BVG(i) of all the groups are calculated. If N in step S741, i is incremented in step S742, and the flow returns to step S732; otherwise, the control returns to the routine shown in FIG. 23.

Figure 36:
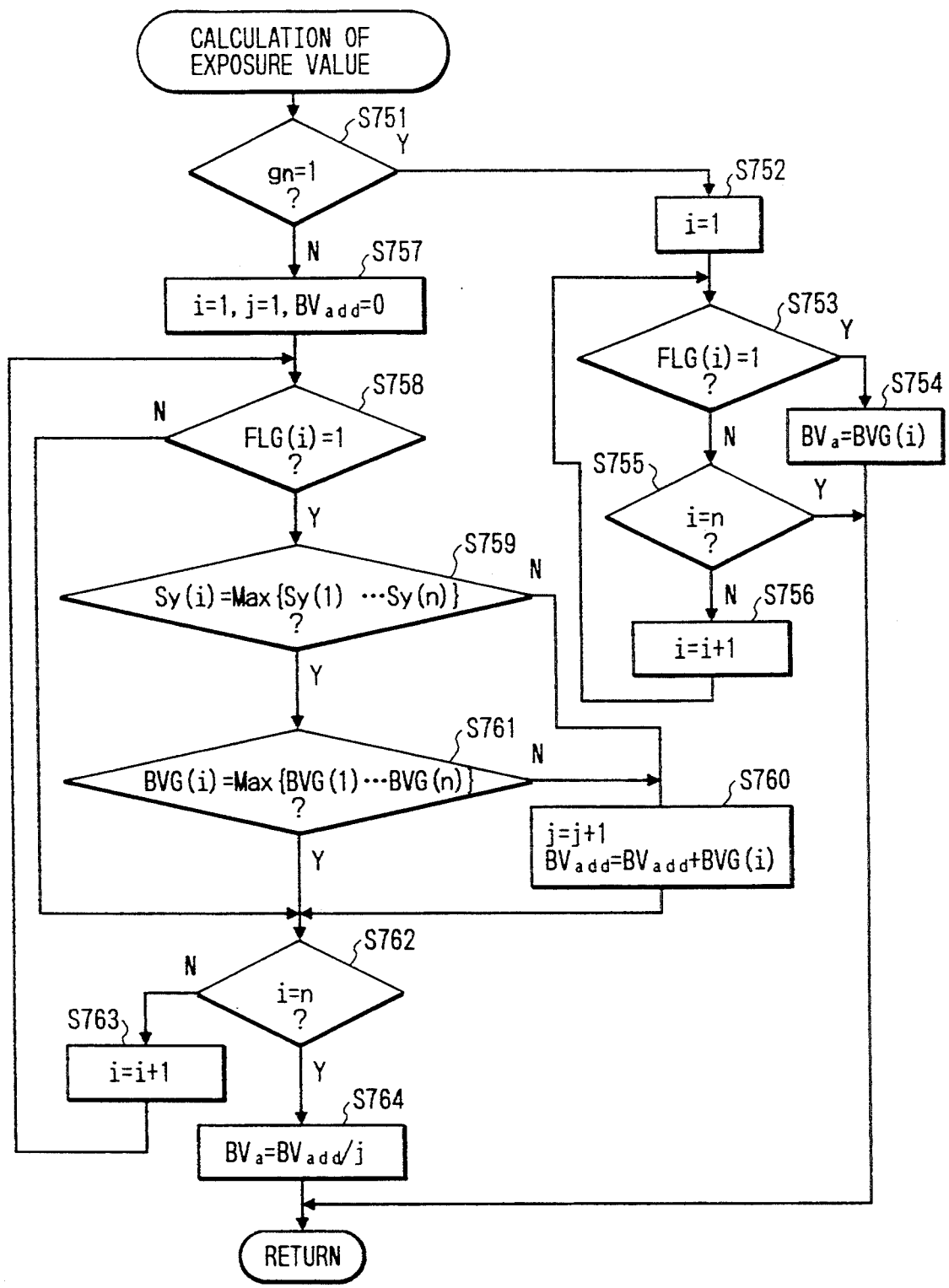
FIG. 36 is a flow chart showing in detail an exposure calculation processing subroutine.

FIG. 36 is a flow chart showing in detail an exposure value calculation processing subroutine in step S407 (FIG. 23). This processing is executed under the control of the exposure value calculating device 53.

As shown in FIG. 36, in step S751, it is checked if the number gn of groups is 1. gn=1 means that the entire objective field is in a single color. In this case, i=1 is set in step S752, and the flow then advances to step S753.

In step S753, it is checked if a flag FLG(i)="1". If Y in step S753, an exposure value BVa is calculated by BVa=BVG(i), and the control returns to the routine shown in FIG. 23. If N in step S753, the flow advances to step S755. In step S755, it is checked if i=n. If N in step S755, i is incremented in step S756, and the flow returns to step S753. If Y in step S755, the control returns to the routine shown in FIG. 23. In this case, the average brightness value of the entire objective field becomes the exposure value BVa.

On the other hand, if N in step S751, i.e., if the number of groups is 2 or more, the flow advances to step S757, and initialization is performed to have i=1, j=1, and $BV_{add}=0$. In step S758, it is checked if a flag FLG(i)="1". If N in step S758, the flow advances to step S762; otherwise, the flow advances to step S759. In step S759, a v-coordinate Sv(i) of the position of the center of balance of a group corresponding to i is the maximum value of v-coordinates Sv(1), Sv(2), . . . , Sv(n) of the centers of balance of the respective groups. If N in step S759, the flow advances to step S760. In step S760, the variable j is incremented by "1", and the average brightness value BVG(i) of a group corresponding to i is added to the current $BV_{add}$ to define new $BV_{add}$. The flow then advances to step S762.

If Y in step S759, the flow advances to step S761 to check if BVG(i) is the maximum value of average brightness values BVG(1), BVG(2), . . . , BVG(n) of the respective groups. If N in step S761, the flow advances to step S760; otherwise, the flow advances to step S762. In step S762, it is checked if i=n. If N in step S762, i is incremented in step S763, and the flow returns to step S758; if Y in step S762, an exposure value BVa is calculated in step S764 as follows:

$$BVa = BV_{add}/j$$

The control then returns to the routine shown in FIG. 23.

More specifically, according to the processing in steps S757 to S764, when there is a group having the highest position of the center of balance in the objective field, and has the highest brightness value, the group is excluded, and an average value of the average brightness values of the remaining groups is determined as the exposure value BVa.

Thereafter, in step S408 in FIG. 23, an exposure control signal is output to the exposure controller 54. The aperture 55 and the shutter 56 are driven on the basis of the exposure value BVa determined in step S407 to perform exposure control (photographing). Thereafter, the processing is ended.

The control sequence by the controller 48 has been described. To summarize this sequence, a plurality of divided elements 46A, i.e., a plurality of light metering regions are grouped on the basis of light metering signals from the divided light metering elements 46A in response to a release operation under a condition that objects to be grouped are adjacent to each other and have a similar color. Then, the position of the center of balance in the objective field and an average brightness value of each group are calculated. When a group, which has the highest position of the center of balance, and the highest brightness value, is present, the group is excluded, and an exposure value is calculated on the basis of the brightness values of the remaining groups. A photographing operation is performed based on the exposure value.

Figure 37A:
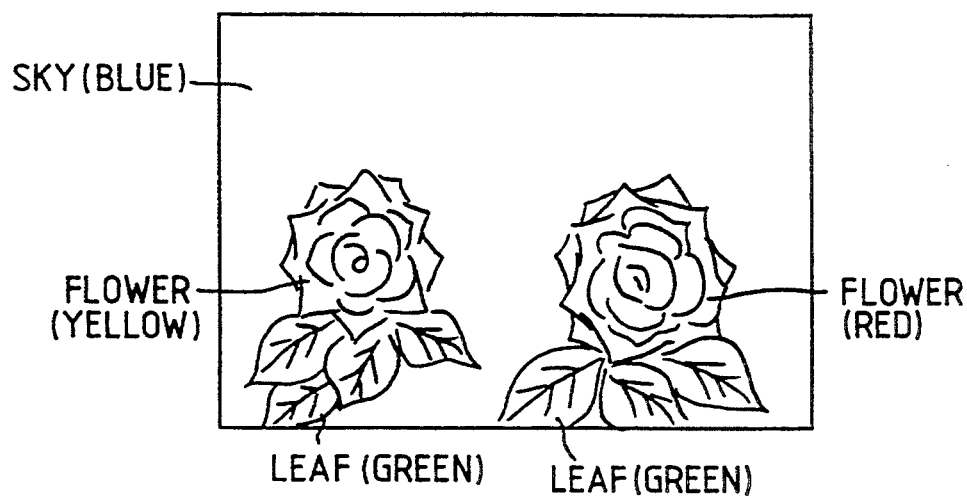
FIGS. 37A and 37B are explanatory views for explaining an operation of this embodiment.
Figure 37B:
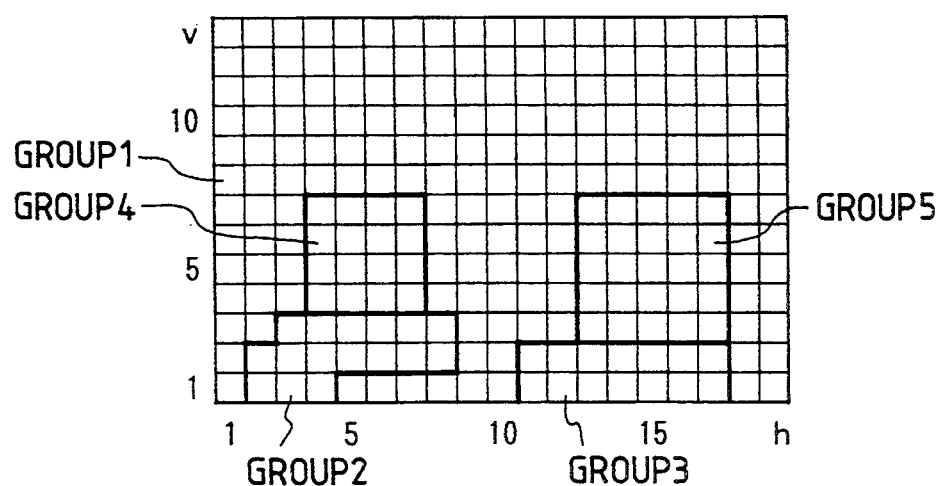

Assuming an objective field shown in, e.g., FIG. 37A, the light metering element 46 is grouped into groups 1 to 5, as shown in FIG. 37B. In this case, since the group 1 corresponding to a sky portion has the highest position of the center of balance, and the highest brightness value, it is excluded, and an exposure value is calculated based on an average value of the average exposure values of the remaining groups 2 to 5. In this manner, the objective field is divided into a plurality of regions, and the divided regions are grouped depending on whether or not they have a similar color. Thus, even when a principal object exists across sunny and shaded places, the principal object can be reliably recognized, and its shape can be accurately determined. As a result, an exposure calculation is made while cutting regions other than the principal object, and a photographing operation can always be performed with a proper exposure value.

In the arrangement of the above embodiment, the light metering element 46 constitutes light metering means, the grouping device 49 constitutes grouping means, the device 52 for calculating the position of the center of balance constitutes means for calculating the position of the center of balance, the brightness value calculating device 51 constitutes brightness value calculating means, and the exposure value calculator 53 constitutes exposure value calculating means.

In the above description, an average brightness value of each group is calculated in the brightness value calculating processing shown in FIG. 35. In place of the average brightness value, a minimum brightness value, a brightness value considering a group area, or the like may be calculated. The exposure value is not limited to an average brightness value of each group. A group, which has the highest position of the center of balance, and the highest brightness value, is excluded. However, groups, which have the positions of the center of balance higher than a predetermined position, and brightness values higher than a predetermined value, may be excluded. The above embodiment exemplifies a case wherein a camera is set horizontally. Therefore, as an element has a larger v-coordinate, its position is higher. However, when the camera is set vertically, the level of the element may be determined based on the h-coordinate. Whether the camera is set horizontally or vertically may be detected by, e.g., a known mercury sensor. The method of dividing the element (light metering region) is not limited to the above embodiment.

A plurality of regions are grouped on the basis of light metering signals each including information associated with a color of an object present in each region under a condition that objects to be grouped are adjacent to each other and have a similar color. In addition, the position of the center of balance in the objective field, and the brightness value of each group are calculated. A group having a relatively high position of the center of balance, and a high brightness value is excluded, and an exposure value is calculated based on brightness values of the remaining groups. Therefore, even when a principal object exists across sunny and shaded places, the principal object can be reliably recognized, and its shape can be accurately determined. Thus, an exposure calculation is made while cutting regions other than the principal object, thus always allowing a photographing operation with a proper exposure value.

What is claimed is:

1. A light metering calculating apparatus, comprising: light metering means for dividing an objective field into a plurality of light metering regions to perform a light metering operation, and outputting light metering signals corresponding to the respective light metering regions; and grouping means for comparing light of adjacent light metering regions based on the corresponding light metering signals from said light metering means, and grouping the plurality light metering regions into one or more groups of light metering regions such that each group is of a non-predetermined shape dependent upon the comparison results and is constituted of adjacent light metering regions having similar light.

2. A light metering calculating apparatus, comprising:

light metering means for dividing an objective field into a plurality of light metering regions to perform a light metering operation, and outputting light metering signals corresponding to the respective light metering regions; and grouping means for comparing brightness values of adjacent light metering regions based on the corresponding light metering signals from said light metering means, and grouping the plurality light metering regions into one or more groups of light metering regions such that each group is of a non-predetermined shape dependent upon the comparison results and is constituted of adjacent light metering regions having similar brightness value.

3. An exposure calculating apparatus, comprising:

light metering means for dividing an objective field into a plurality of light metering regions to perform a light metering operation, and outputting light metering signals corresponding to the respective light metering regions;

grouping means for comparing brightness values of adjacent light metering regions based on the corresponding light metering signals from said light metering means, and grouping the plurality light metering regions into one or more groups of light metering regions such that each group is of a non-predetermined shape dependent upon the comparison results and is constituted of adjacent light metering regions having similar brightness value;

group brightness calculating means for calculating an average brightness value in each group;

means for calculating a position of a center of balance of each group;

selection means for selecting a group, to be used in an exposure calculation, based on average brightness value or position of the center of balance; and exposure value calculating means for calculating an exposure value based on the average brightness value of the group selected by said selection means.

4. An apparatus according to claim 3, further comprising:

number of group calculating means for calculating the number of groups grouped by said grouping means.

5. An apparatus according to claim 3, wherein said selection means excludes a group having the largest average brightness value.

6. An apparatus according to claim 3, wherein said selection means excludes a group having the highest position of the center of balance.

7. An apparatus according to claim 3, wherein when groups having similar brightness value correspond to the same object, said grouping means combines the groups.

8. A light metering calculating apparatus, comprising:

light metering means for performing a light metering operation while dividing an objective field into a plurality of light metering regions, and outputting light metering signals each including information associated with a color of an object present in a corresponding light metering region; and grouping means for grouping the plurality of light metering regions according to color, based on the light metering signals from said light metering means, such that adjacent light metering regions having similar color are grouped as one group.

9. An exposure calculating apparatus, comprising:

light metering means for performing a light metering operation while dividing an objective field into a plurality of light metering regions, and outputting light metering signals each including information associated with a color of an object present in a corresponding light metering region;

grouping means for grouping the plurality of light metering regions according to color, based on the light metering signals from said light metering means, such that adjacent light metering regions having similar color are grouped as one group;

group brightness calculating means for calculating an average brightness value in each group based on average brightness value or position of the center of balance; and exposure value calculating means for calculating an exposure value based on the average brightness value of the group selected by said selection means.

10. An apparatus according to claim 9, further comprising:

number of group calculating means for calculating the number of groups grouped by said grouping means.

11. An apparatus according to claim 9, wherein said selection means excludes a group having the largest average brightness value.

12. An apparatus according to claim 9, wherein said selection means excludes a group having the highest position of the center of balance.

13. An apparatus according to claim 9, wherein when groups having similar brightness value correspond to the same object, said grouping means combines the groups.

14. A camera which performs a light metering calculating operation, comprising:

light metering means for dividing an objective field into a plurality of light metering regions to perform a light metering operation, and outputting light metering signals corresponding to the respective light metering regions; and grouping means for comparing light of adjacent light metering regions based on the corresponding light metering signals from said light metering means, and grouping the plurality light metering regions into one or more groups of light metering regions such that each group is of a non-predetermined shape dependent upon the comparison results and is constituted of adjacent light metering regions having similar light.

15. A camera which performs a light metering calculating operation, comprising:

light metering means for dividing an objective field into a plurality of light metering regions to perform a light metering operation, and outputting light metering signals corresponding to the respective light metering regions; and grouping means for comparing brightness values of adjacent light metering regions based on the corresponding light metering signals from said light metering means, and grouping the plurality light metering regions into one or more groups of light metering regions such that each group is of a non-predetermined shape dependent upon the comparison results and is constituted of adjacent light metering regions having similar brightness value.

16. A camera which performs an exposure calculating operation, comprising:
light metering means for dividing an objective field into a plurality of light metering regions to perform a light metering operation, and outputting light metering signals corresponding to the respective light metering regions;
grouping means for comparing brightness values of adjacent light metering regions based on the corresponding light metering signals from said light metering means, and grouping the plurality light metering regions into one or more groups of light metering regions such that each group is of a non-predetermined shape dependent upon the comparison results and is constituted of adjacent light metering regions having similar brightness value;
group brightness calculating means for calculating an average brightness value in each group;
means for calculating a position of a center of balance of each group;
selection means for selecting a group, to be used in an exposure calculation, based on average brightness value or position of the center of balance; and
exposure value calculating means for calculating an exposure value based on the average brightness value of the group selected by said selection means.

17. A camera according to claim 16, further comprising:
number of group calculating means for calculating the number of groups grouped by said grouping means.

18. A camera according to claim 16, wherein said selection means excludes a group having the largest average brightness value.

19. A camera according to claim 16, wherein said selection means excludes a group having the highest position of the center of balance.

20. A camera according to claim 16, wherein when groups having similar brightness value correspond to the same object, said grouping means combines the groups.

21. A camera which performs a light metering calculating operation, comprising:
light metering means for performing a light metering operation while dividing an objective field into a plurality of light metering regions, and outputting light metering signals each including information associated with a color of an object present in a corresponding light metering region; and
grouping weans for grouping the plurality of light metering regions according to color, based on the light metering signals from said light metering means, such that adjacent light metering regions having similar color are grouped as one group.

22. A camera which performs an exposure calculating operation, comprising:
light metering means for performing a light metering operation while dividing an objective field into a plurality of light metering regions, and outputting light metering signals each including information associated with a color of an object present in a corresponding light metering region;
grouping means for grouping the plurality of light metering regions according to color, based on the light metering signals from said light metering means, such that adjacent light metering regions having similar color are grouped as one group;
group brightness calculating means for calculating an average brightness value in each group based on the light metering signals from said light metering means;
means for calculating a position of a center of balance of each group;
selection means for selecting a group, to be used in an exposure calculation, based on average brightness value or position of the center of balance; and
exposure value calculating means for calculating an exposure value based on the average brightness value of the group selected by said selection means.

23. A camera according to claim 22, further comprising:
number of group calculating means for calculating the number of groups grouped by said grouping means.

24. A camera according to claim 22, wherein said selection means excludes a group having the largest average brightness value.

25. A camera according to claim 22, wherein said selection means excludes a group having the highest position of the center of balance.

26. A camera according to claim 22, wherein when groups having similar brightness value correspond to the same object, said grouping means combines the groups.

27. A light metering method, comprising:
metering light in a plurality of light metering regions into which an objective field is divided and outputting light metering signals corresponding to the respective light metering regions;
comparing light of adjacent light metering regions based on the corresponding light metering signals; and
grouping the plurality light metering regions into one or more groups of light metering regions such that each group is of a non-predetermined shape dependent upon the comparison results and is constituted of adjacent light metering regions having similar light.

28. A light metering method, comprising:
metering light in a plurality of light metering regions into which an objective field is divided and outputting light metering signals corresponding to the respective light metering regions;
comparing brightness values of adjacent light metering regions based on the corresponding light metering signals; and
grouping the plurality light metering regions into one or more groups of light metering regions such that each group is of a non-predetermined shape dependent upon the comparison results and is constituted of adjacent light metering regions having similar brightness value.

29. An exposure method, comprising:
metering light in a plurality of light metering regions into which an objective field is divided and outputting light metering signals corresponding to the respective light metering regions;

comparing brightness values of adjacent light metering regions based on the corresponding light metering signals;

grouping the plurality light metering regions into one or more groups of light metering regions such that each group is of a non-predetermined shape dependent upon the comparison results and is constituted of adjacent light metering regions having similar brightness value;

calculating an average brightness value in each group;

calculating a position of a center of balance of each group;

selecting a group, to be used in an exposure calculation, based on average brightness value or position of the center of balance; and calculating an exposure value for an exposure operation based on the average brightness value of the selected group.

30. A method according to claim 29, further comprising:

calculating the number of groups grouped by said grouping.

31. A method according to claim 29, wherein said selecting includes excluding a group having the largest average brightness value.

32. A method according to claim 29, wherein said selecting includes excluding a group having the highest position of the center of balance.

33. A method according to claim 29, wherein said grouping includes combining groups having similar brightness value that correspond to the same object.

34. A light metering method, comprising: metering light in a plurality of light metering regions into which an objective field is divided and outputting light metering signals each including information associated with a color of an object present in a corresponding light metering region; and grouping the plurality of light metering regions according to color, based on the light metering signals, such that adjacent light metering regions having similar color are grouped as one group.

35. An exposure method, comprising: metering light in a plurality of light metering regions into which an objective field is divided and outputting light metering signals each including information associated with a color of an object present in a corresponding light metering region; and grouping the plurality of light metering regions according to color, based on the light metering signals, such that adjacent light metering regions having similar color are grouped as one group;

calculating an average brightness value in each group based on the light metering signals;

calculating a position of a center of balance of each group;

selecting a group, to be used in an exposure calculation, based on average brightness value or position of the center of balance; and calculating an exposure value for an exposure operation based on the average brightness value of the selected group.

36. A method according to claim 35, further comprising:

calculating the number of groups grouped by said grouping.

37. A method according to claim 35, wherein said selecting includes excluding a group having the largest average brightness value.

38. A method according to claim 35, wherein said selecting includes excluding a group having the highest position of the center of balance.

39. A method according to claim 35, wherein said grouping includes combining groups having similar brightness value that correspond to the same object.

40. A light metering method in a camera, comprising:

metering light in a plurality of light metering regions into which an objective field is divided and outputting light metering signals corresponding to the respective light metering regions;

comparing light of adjacent light metering regions based on the corresponding light metering signals; and grouping the plurality light metering regions into one or more groups of light metering regions such that each group is of a non-predetermined shape dependent upon the comparison results and is constituted of adjacent light metering regions having similar light.

41. A light metering method in a camera, comprising:

metering light in a plurality of light metering regions into which an objective field is divided and outputting light metering signals corresponding to the respective light metering regions;

comparing brightness values of adjacent light metering regions based on the corresponding light metering signals; and grouping the plurality light metering regions into one or more groups of light metering regions such that each group is of a non-predetermined shape dependent upon the comparison results and is constituted of adjacent light metering regions having similar brightness value.

42. An exposure method in a camera, comprising:

metering light in a plurality of light metering regions into which an objective field is divided and outputting light metering signals corresponding to the respective light metering regions;

comparing brightness values of adjacent light metering regions based on the corresponding light metering signals;

grouping the plurality light metering regions into one or more groups of light metering regions such that each group is of a non-predetermined shape dependent upon the comparison results and is constituted of adjacent light metering regions having similar brightness value;

calculating an average brightness value in each group;

calculating a position of a center of balance of each group;

selecting a group, to be used in an exposure calculation, based on average brightness value or position of the center of balance; and calculating an exposure value for an exposure operation based on the average brightness value of the selected group.

43. A method according to claim 42, further comprising:

calculating the number of groups grouped by said grouping.

44. A method according to claim 42, wherein said selecting includes excluding a group having the largest average brightness value.

45. A method according to claim 42, wherein said selecting includes excluding a group having the highest position of the center of balance.

46. A method according to claim 42, wherein said grouping includes combining groups having similar brightness value that correspond to the same object.

47. A light metering method in a camera, comprising:
 metering light in a plurality of light metering regions into which an objective field is divided and outputting light metering signals each including information associated with a color of an object present in a corresponding light metering region; and
 grouping the plurality of light metering regions according to color, based on the light metering signals, such that adjacent light metering regions having similar color are grouped as one group.

48. An exposure method in a camera, comprising:
 metering light in a plurality of light metering regions into which an objective field is divided and outputting light metering signals each including information associated with a color of an object present in a corresponding light metering region;
 grouping the plurality of light metering regions according to color, based on the light metering signals, such that adjacent light metering regions having similar color are grouped as one group;
 calculating an average brightness value in each group based on the light metering signals;
 calculating a position of a center of balance of each group;
 selecting a group, to be used in an exposure calculation, based on average brightness value or position of the center of balance; and
 calculating an exposure value for an exposure operation based on the average brightness value of the selected group.

49. A method according to claim 48, further comprising:
 calculating the number of groups grouped by said grouping.

50. A method according to claim 48, wherein said selecting includes excluding a group having the largest average brightness value.

51. A method according to claim 48, wherein said selecting step includes excluding a group having the highest position of the center of balance.

52. A method according to claim 48, wherein said grouping includes combining groups having similar brightness value that correspond to the same object.

* * * * *